US008225215B2

(12) United States Patent
Oswalt

(10) Patent No.: US 8,225,215 B2
(45) Date of Patent: Jul. 17, 2012

(54) INTEGRATED DEPLOYMENT OF SOFTWARE PROJECTS

(75) Inventor: Lonny Lee Oswalt, Monte Sereno, CA (US)

(73) Assignee: MobileFrame, LLC, Los Gatos, CA (US)

( * ) Notice: Subject to any disclaimer, the term of this patent is extended or adjusted under 35 U.S.C. 154(b) by 317 days.

(21) Appl. No.: 12/502,934

(22) Filed: Jul. 14, 2009

(65) Prior Publication Data
US 2009/0276717 A1    Nov. 5, 2009

Related U.S. Application Data

(63) Continuation of application No. 11/056,711, filed on Feb. 10, 2005, now Pat. No. 7,577,911.

(60) Provisional application No. 60/544,736, filed on Feb. 12, 2004.

(51) Int. Cl.
G06F 3/00       (2006.01)
G06F 3/01       (2006.01)

(52) U.S. Cl. ........ 715/744; 715/735; 715/736; 715/740; 715/762; 715/765

(58) Field of Classification Search .................. 715/735, 715/736, 740, 762, 765, 744
See application file for complete search history.

(56) References Cited

U.S. PATENT DOCUMENTS

| | | | |
|---|---|---|---|
| 5,701,453 A | 12/1997 | Maloney et al. | |
| 5,704,029 A | 12/1997 | Wright, Jr. | |
| 5,706,509 A * | 1/1998 | Man-Hak Tso | 707/625 |
| 5,958,012 A | 9/1999 | Battat et al. | |
| 6,243,859 B1 | 6/2001 | Chen-Kuang | |
| 6,289,380 B1 | 9/2001 | Battat et al. | |
| 6,300,947 B1 | 10/2001 | Kanevsky | |
| 6,301,581 B1 | 10/2001 | Smiley | |
| 6,347,316 B1 | 2/2002 | Redpath | |
| 6,757,696 B2 * | 6/2004 | Multer et al. | 1/1 |
| 6,820,088 B1 * | 11/2004 | Hind et al. | 1/1 |
| 6,925,477 B1 | 8/2005 | Champagne et al. | |
| 6,947,943 B2 * | 9/2005 | DeAnna et al. | 717/120 |
| 7,028,258 B1 | 4/2006 | Thacker et al. | |
| 7,200,720 B1 | 4/2007 | Yang et al. | |
| 7,266,370 B2 * | 9/2007 | Paddon et al. | 455/418 |
| 7,464,067 B2 | 12/2008 | Chestnut et al. | |
| 7,565,381 B2 | 7/2009 | Oswalt | |
| 7,577,911 B2 | 8/2009 | Oswalt | |
| 7,581,176 B2 | 8/2009 | Wilson | |
| 2001/0011364 A1 | 8/2001 | Stoub | |
| 2002/0033843 A1 * | 3/2002 | Loos et al. | 345/740 |
| 2002/0040445 A1 | 4/2002 | Flanagin et al. | |
| 2002/0066074 A1 * | 5/2002 | Jabri | 717/105 |

(Continued)

OTHER PUBLICATIONS

International Search Report, Dated Nov. 1, 2005, PCT/US2005/04559.

(Continued)

*Primary Examiner* — Nicholas Augustine
(74) *Attorney, Agent, or Firm* — Beyer Law Group LLP

(57) ABSTRACT

A single integrated software project deployment platform is provided that allows administrators to easily and effectively deploy software projects to remote computers. This allows business users with no Information Technology background or capabilities to develop and deploy sophisticated applications for execution on remote systems, such as mobile computers. Mobile workers can connect to backend enterprise systems in real-time to capture rich data types such as digital signatures, photos, speech recognition, bar code scans, etc. while in the field.

14 Claims, 29 Drawing Sheets

U.S. PATENT DOCUMENTS

| | | | |
|---|---|---|---|
| 2002/0147850 A1* | 10/2002 | Richards et al. ............... | 709/248 |
| 2002/0194155 A1 | 12/2002 | Aldridge et al. | |
| 2003/0004955 A1 | 1/2003 | Cedola et al. | |
| 2003/0014445 A1 | 1/2003 | Formanek et al. | |
| 2003/0018714 A1* | 1/2003 | Mikhailov et al. ............ | 709/203 |
| 2003/0055668 A1* | 3/2003 | Saran et al. ........................ | 705/1 |
| 2003/0076349 A1* | 4/2003 | Slaby ............................ | 345/735 |
| 2003/0135492 A1 | 7/2003 | Kauffman et al. | |
| 2003/0149762 A1* | 8/2003 | Knight et al. ................. | 709/224 |
| 2003/0179227 A1* | 9/2003 | Ahmad et al. ................ | 345/736 |
| 2003/0217053 A1* | 11/2003 | Bachman et al. ................. | 707/4 |
| 2003/0234808 A1* | 12/2003 | Huang et al. ................. | 345/735 |
| 2004/0181502 A1* | 9/2004 | Yeh et al. ........................... | 707/1 |
| 2005/0091233 A1 | 4/2005 | Friske et al. | |
| 2006/0242685 A1* | 10/2006 | Heard et al. ...................... | 726/3 |
| 2007/0112574 A1* | 5/2007 | Greene ............................. | 705/1 |
| 2007/0177571 A1 | 8/2007 | Caufield et al. | |

OTHER PUBLICATIONS

Supplemental . Search Report, Dated Jun. 5, 2008 from EP Patent Appl. EP 05 71 3470.

MobileFrame, Inc. "Valley Crest Proposal by Assignee", Feb. 20, 2003, 32 Pages.

"Sams Teach Yourself JavaScript in 24 Hours", Third Edition, Sams, Jun. 2002, "Getting Data with Forms Section".

Office Action Dated May 11, 2007 from U.S. Appl. No. 11/056,457.
Office Action Dated Nov. 26, 2007 from U.S. Appl. No. 11/056,457.
Office Action Mailed May 14, 2008 from U.S. Appl. No. 11/056,457.
Office Action Mailed Oct. 15, 2008 from U.S. Appl. No. 11/056,457.
Office Action Mailed Nov. 21, 2008 from U.S. Appl. No. 11/056,457.
Office Action Dated May 16, 2007 from U.S. Appl. No. 11/055,941.
Office Action Mailed Dec. 10, 2007 from U.S. Appl. No. 11/055,941.
Office Action Mailed Jun. 23, 2008 from U.S. Appl. No. 11/055,941.
Office Action Mailed Dec. 2, 2008 from U.S. Appl. No. 11/055,941.
Office Action Mailed May 11, 2009 from U.S. Appl. No. 11/055,941.
Office Action Mailed Feb. 4, 2008 from U.S. Appl. No. 11/056,711.
Office Action Mailed Aug. 20, 2008 from U.S. Appl. No. 11/056,711.
Office Action Mailed Feb. 4, 2009 from U.S. Appl. No. 11/056,711.
Office Action Dated Oct. 18, 2007 from U.S. Appl. No. 11/056,585.
Office Action Mailed Apr. 10, 2008 from U.S. Appl. No. 11/056,585.
Office Action Mailed Sep. 10, 2008 from U.S. Appl. No. 11/056,585.
Office Action Mailed Dec. 29, 2008 from U.S. Appl. No. 11/056,585.
Office Action Mailed May 27, 2009 from U.S. Appl. No. 11/056,585.
Notice of Allowance Mailed Jun. 3, 2009 from U.S. Appl. No. 11/056,457.
Notice of Allowance Mailed Jun. 26, 2009 from U.S. Appl. No. 11/056,711.
Office Action Mailed Sep. 17, 2009 of U.S. Appl. No. 11/055,941.
Notice of Allowance Mailed Mar. 17, 2010 from U.S. Appl. No. 11/055,941.
EP Office Action dated May 18, 2010 from EP Application No. 05 713 470.2.
U.S. Office Action dated Apr. 6, 2010 from U.S. Appl. No. 11/056,585.

* cited by examiner

Page 1

Page 2

INTEGRATED DEPLOYMENT OF SOFTWARE PROJECTS

CROSS-REFERENCE TO RELATED APPLICATION

This application is a continuation of U.S. patent application Ser. No. 11/056,711, entitled "INTEGRATED DEPLOYMENT OF SOFTWARE PROJECTS", by Lonny Lee Oswalt, filed Feb. 10, 2005 which claims priority based on Provisional Application No. 60/544,736, entitled "CONFIGURABLE MOBILE APPLICATION TO DYNAMICALLY CREATE ENFORCEABLE WORKFLOW" by Lonny Lee Oswalt, filed on Feb. 12, 2004, herein incorporated by reference in its entirety.

This application is related to co-pending application Ser. No. 11/056,585, entitled "INTELLIGENT RENDERING ON A MOBILE COMPUTING DEVICE" by Lonny Lee Oswalt, filed on Feb. 10, 2005.

This application is related to co-pending application Ser. No. 11/056,457, entitled "SMART SYNCHRONIZATION" by Lonny Lee Oswalt, filed on Feb. 10, 2005.

This application is related to co-pending application Ser. No. 11/055,941, entitled "SMART DATABASE" by Lonny Lee Oswalt, filed on Feb. 10, 2005.

FIELD OF THE INVENTION

The present invention relates to the field of computer software. More specifically, the present invention relates to the integrated deployment of software projects to remote computers.

BACKGROUND OF THE INVENTION

Currently, it is common for large numbers of mobile workers who perform tasks in the field to record their work-product on paper-based forms. Subsequently, they return these forms to a central office where clerical personnel manually enter the data into a company database. This process, however, is error-prone and creates unnecessary delays in dissemination of business-critical information from the field to the business management. With the advent of mobile computers such as laptops, tablets, and PDAs, a quantum leap in efficiency can be achieved by having mobile workers record their data on handheld devices which can synchronize this information directly into the business database via a wired or wireless connection. This eliminates all transcription errors associated with paper forms and greatly speeds the flow of business information to the decision makers.

In order to capitalize on the business promise of handheld devices, firms need applications built specifically for mobile workers. These applications are unique because they must integrate data from across the entire business enterprise as well as from third parties such as suppliers and partners in a coherent work environment tuned for a company's mobile workforce.

Application development tools and infrastructure are commonplace, but these require costly and time-consuming development to create lines of business applications. Moreover, such business solutions tend to be costly and inflexible, requiring expensive and time-consuming custom development when business processes require an application to be changed. As business processes evolve, the mobile software applications supporting those enterprises must be easy to change and deploy to mobile workers "on the fly".

Typical mobile software deployment platforms, however, suffer from several drawbacks. Many were designed with desktop (i.e., non-mobile) devices in mind. While they still can function in the mobile world, they do not take into account many of the unique features of mobile computers, such as the increased use of different operating systems, or the possibility of frequent network dropouts. Furthermore, they are typically designed such that an administrator needs programming or information technology skills in order to set up distribution of updates, as hard coded implementations are standard in this field.

Additionally, software development platforms typically utilize relational databases for storage. A relational database stores data in a number of disparate tables, each of which is linked or related to another table. A table is organized by rows and columns, each row or record containing the same columns or fields. A conventional flat-file database would store all the data in a single table, but the relational model allows for maximum flexibility for querying the data. Data need only be brought together for a particular query, so the structure of the database contains no assumptions about what sort of queries may be required in the future. Another powerful feature of the relational model is that each data item appears only in a single place in the tables and thus only needs to be updated in one place when it changes.

In the relational model, each table has a primary key, which is a field or combination of fields that uniquely identifies each record in the table. The primary key provides a means to distinguish one record from all others in the table.

When a field in one table matches the primary key (or a candidate key) of another table, the field is referred to as a foreign key. The foreign key is the anchor on the many side of a one-to-many or many-to-many relationship, much as the primary or candidate key is the anchor on the one side of this relationship. A foreign key is a linchpin used to ensure that invalid data is not entered into a table. It also prevents a user from deleting or updating in a way that might leave orphan rows.

There are several different classes of relationships possible using a relational model. The first is a one-to-one relationship. Two tables are related in a one-to-one relationship if, for every row in the first table, there is at most one row in a second table. True one-to-one relationships seldom occur in the real world. This type of relationship is often created to get around some limitation of the database management software rather than to model a real-world situation. For example, one-to-one relationships may be necessary in a database when there is a need to split a table into two or more tables because of security or performance concerns. Tables that are related in a one-to-one relationship share the same primary key.

A second type of relationship is a one-to-many relationship. Two tables are related in a one-to-many relationship if, for every row in a first table, there can be zero, one, or many rows in a second table, but for every row in the second table there is exactly one row in the first table. The one-to-many relationship is also referred to as a parent-child or master-detail relationship.

A third type of relationship is a many-to-many relationship. Two tables are related in a many-to-many relationship when, for every row in a first table, there can be many rows in the second table, and for every row in the second table, there can be many rows in the first table. Many-to-many relationships can't be directly modeled in the typical relational database, and therefore these types of relationships must be broken into multiple one-to-many relationships. A third table, known as a linking table, may then be utilized to model the relationships between the two tables.

Regardless of the type of relationship used, past relational models utilized foreign keys for the "many" side of the relationship (except for one-to-one of course). These foreign keys, however, must be constantly managed to ensure that no errors occur in the storage of the data. This wastes both computing power and memory space. Additionally, the traditional heavy-weight dependence on foreign key relationships causes tables to have database enforced key constraints, which limits the ability of a user to easily add new tables or permutations.

What is needed is a solution that overcomes the limitations of prior solutions.

BRIEF DESCRIPTION

A single integrated software project deployment platform is provided that allows administrators to easily and effectively deploy software projects to remote computers. This allows business users with no Information Technology background or capabilities to develop and deploy sophisticated applications for execution on remote systems, such as mobile computers. Mobile workers can connect to backend enterprise systems in real-time to capture rich data types such as digital signatures, photos, speech recognition, bar code scans, etc. while in the field.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Embodiments of the present invention are described herein in the context of a system of computers, servers, and software.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hard-wired devices, field programmable gate arrays (FPGAs), application specific integrated circuits (ASICs), or the like, may also be used without departing from the scope and spirit of the inventive concepts disclosed herein.

The present invention provides a single integrated software project deployment platform that allows administrators to easily and effectively deploy software projects to remote computers. This allows business users with no Information Technology background or capabilities to develop and deploy sophisticated applications for execution on remote systems, such as mobile computers. Mobile workers can connect to backend enterprise systems in real-time to capture rich data types such as digital signatures, photos, speech recognition, bar code scans, etc. while in the field.

It should be noted that while the applicability of the present invention to mobile computing will be described throughout this document, the present invention should not be limited to the deployment of projects to mobile computers. Many of the elements of the present invention could apply more generally to any type of computers.

Figure 1:
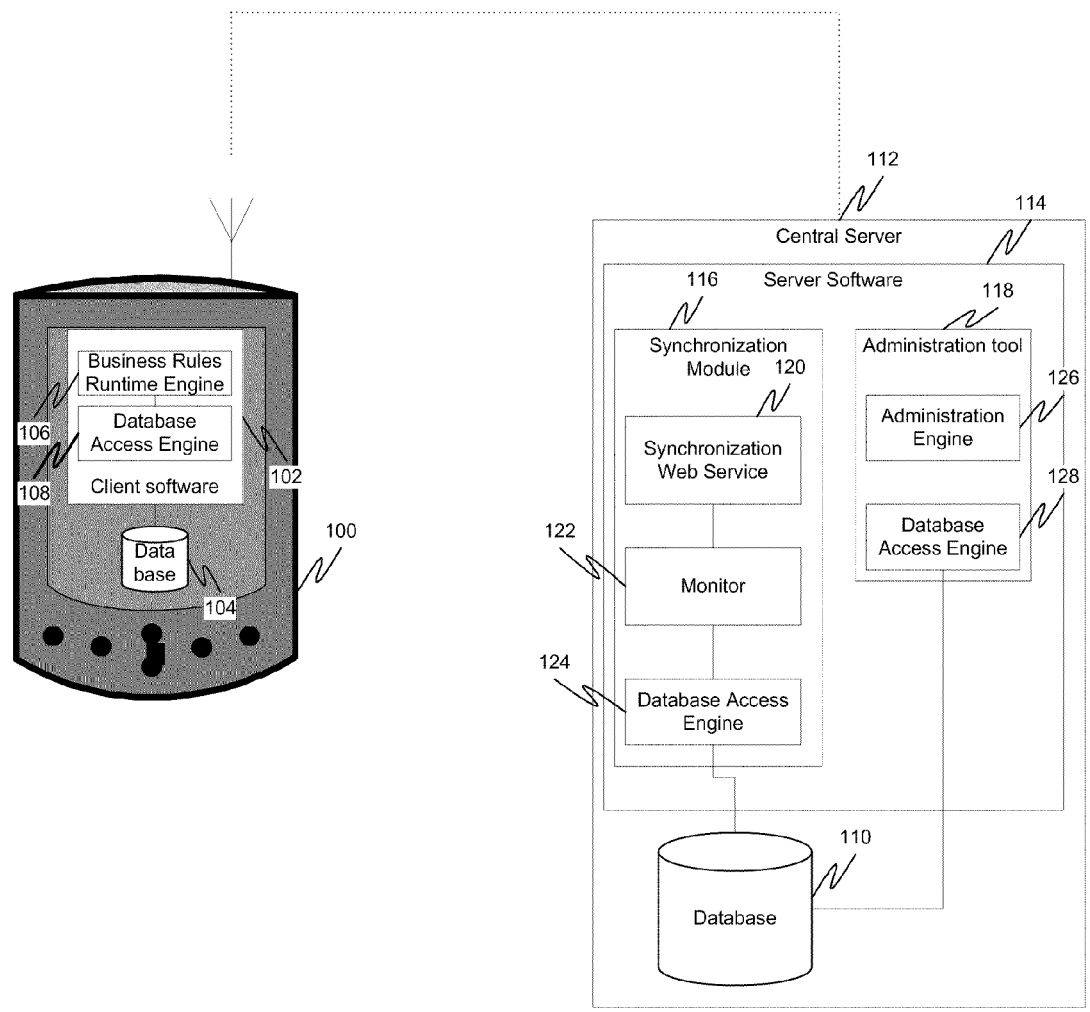
FIG. 1 is a block diagram illustrating an architecture for integrated deployment of software projects in accordance with an embodiment of the present invention.

FIG. 1 is a block diagram illustrating an architecture for integrated deployment of software projects in accordance with an embodiment of the present invention. Each element in this architecture may be embodied in software, hardware, or any combination thereof. A remote computer such as a mobile device 100 may contain client software 102 and a local database 104. The client software 102 may include a Business Rules Runtime Engine 106 and a database access engine 108. The Business Rules Runtime Engine 106 may interpret application logic received from a central server and render a user interface for the application logic based on the platform and language of the mobile device 100. The Business Rules Runtime Engine 106 may also receive and execute automatic updates to various plug-ins and system software on the client software 102, as well as automatically discover appropriate device drivers. The database access engine 108 may interface with the Business Rules Runtime Engine 106 to provide disconnected, connected, or hybrid data access to the local database 104 and/or central database 110.

A central server 112 may contain server software 114. The central server 112 may also contain a central database 110, however in many implementations it will be more desirable to locate the central database 110 outside of the central server 112. The server software 114 may include a synchronization module 116 and an administration tool 118. The synchronization module 116 may utilize a synchronization web service 120 to coordinate the synchronization of projects, applications, plug-ins, and system updates and perform communication hub messaging. A monitor 122 may monitor the system and automatically configure it to improve efficiency. Access to the central database 110 may be facilitated through a database access engine 124.

The administration tool 118 may include an administration engine 126 and a database access engine 128. The administration engine 126 may provide point and click authoring of applications and workflow, deployment management, enterprise data authoring, user administration, plug-in management, project management, results viewing and reporting, enterprise data management, Lightweight Directory Access Protocol (LDAP) Integration, and definition of an extensible workflow/device model. Access to the central database 110 may be facilitated through the database access engine 128.

The central database 110 may provide for support of local, external, compound, or other types of data objects. However, many types of database implementations are possible in accordance with the present invention, and thus this should not be read as limiting.

A business administrator may create a software project using the administration tool 118. Projects may include software applications (also known as tasks) as well as workflow. Each application may comprise a series of data gathering "steps". A step may contain information regarding the onscreen prompt for the data, the type of data expected (e.g., text, date/time, barcode, photograph) and the type of input mechanism to capture the data (e.g., textbox, calendar, barcode scanner, camera). Steps that capture rich data types requiring external devices need not prompt for device specific information such as hardware settings. Any device that supports the rich data type may be automatically discovered and used on the client using automatic device driver discovery. Steps may also contain options for defining valid lists of values, minimum, and maximum values, formatting of the onscreen data, translation of onscreen values to database values, and data present requirements. By default the order in which the steps are provided by the business administrator will be the order they are presented to the user. A step may also optionally contain workflow. Workflow will be described in more detail later, but it can be fired during step validation or after the value has been accepted into the step.

These steps may then be stored in the central database along with their attributes and then synchronized with the client software. On the client software side, the user interface could be automatically rendered or the administrator can design custom screens. Automatic rendering of a user interface will be described in more detail below.

Figure 2:
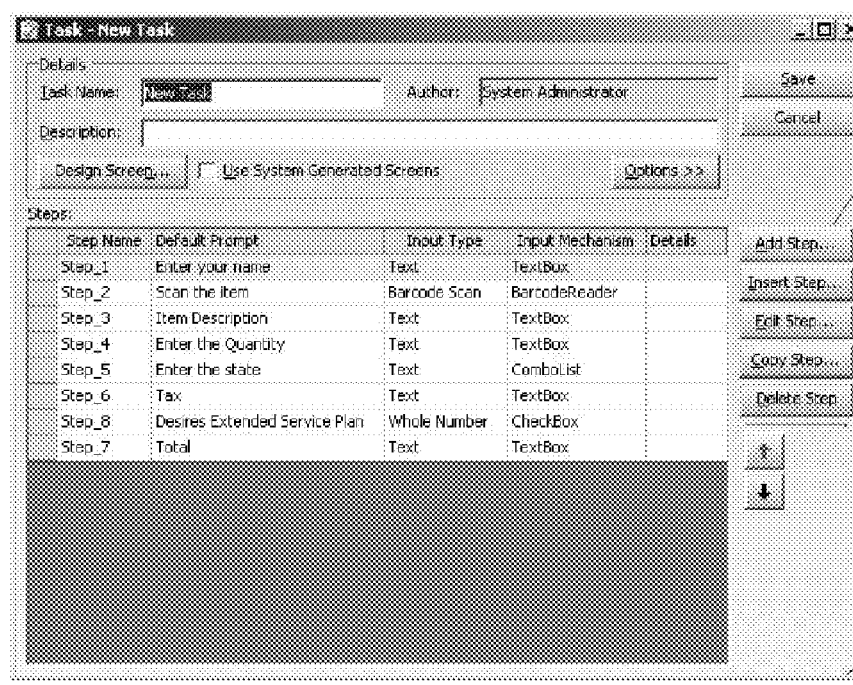
FIG. 2 is a diagram illustrating a screen capture of adding a step in accordance with an embodiment of the present invention.
Figure 3:
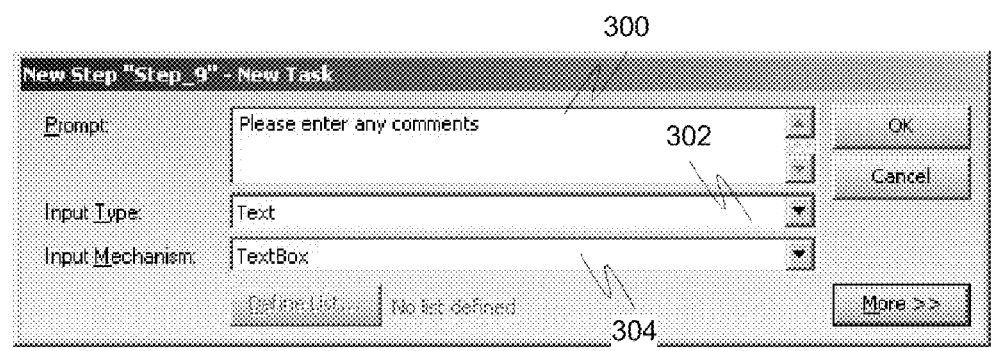
FIG. 3 is a diagram illustrating a screen capture of a step prompt in accordance with an embodiment of the present invention.
Figure 4:
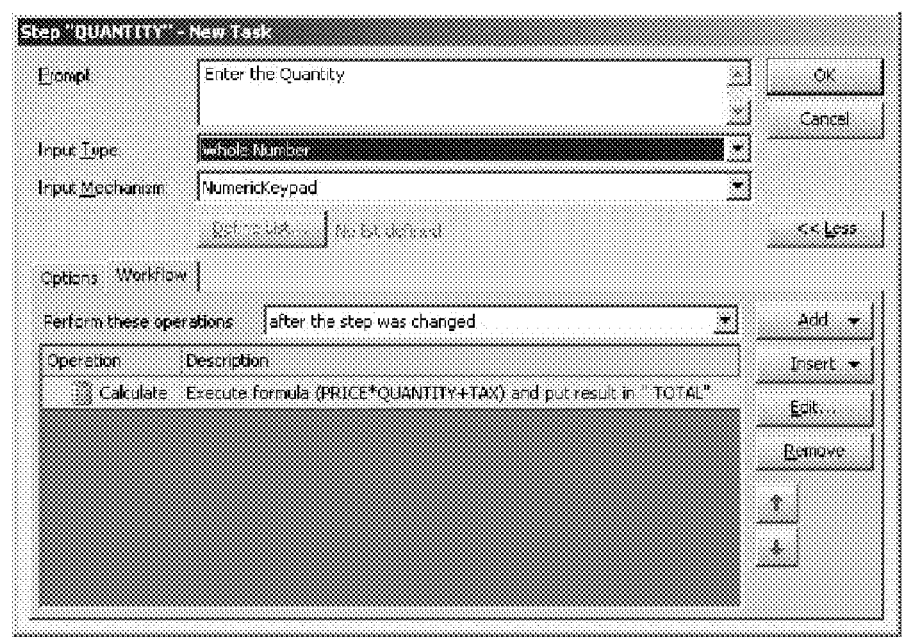
FIG. 4 is a diagram illustrating a screen capture of editing workflow in accordance with an embodiment of the present invention.
Figure 5:
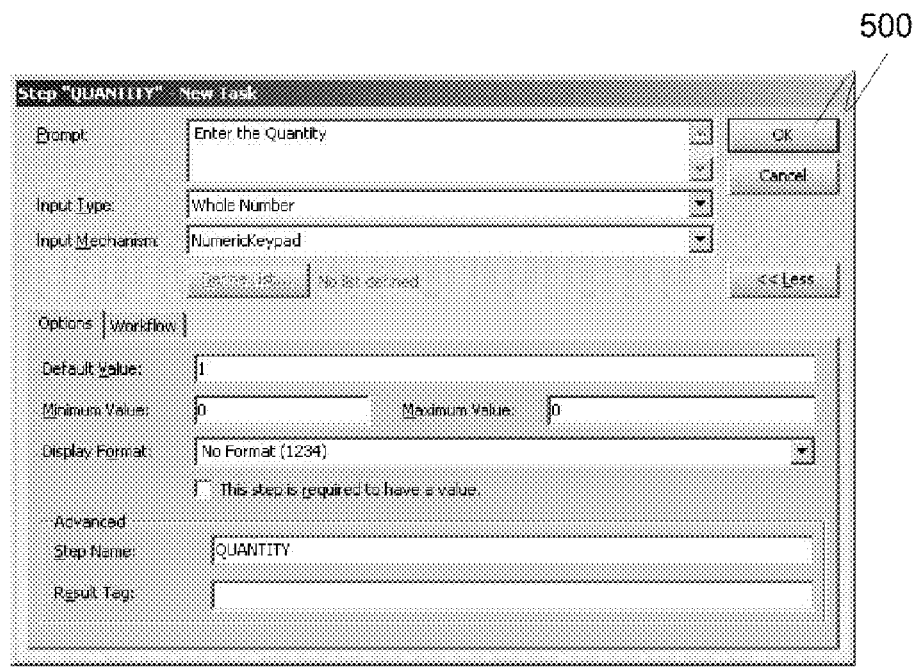
FIG. 5 is a diagram illustrating a screen capture of adding options in accordance with an embodiment of the present invention.

Authoring of the application may be performed by the business administrator using a point and click interface. This is depicted in FIGS. 2-5. FIG. 2 is a diagram illustrating a screen capture of adding a step in accordance with an embodiment of the present invention. First, the business administrator may click an add step button 200 using a mouse or by pressing enter while the add step button 200 has focus. FIG. 3 is a diagram illustrating a screen capture of a step prompt in accordance with an embodiment of the present invention. The business administrator is presented with a means to enter a prompt for the step 300, enter the data type expected 302, and enter an input mechanism 304 for the data. The business administrator may then optionally edit workflow for the step or set various step options including the steps name, default value, range of numeric values or string lengths allowed, lists, and format, as depicted in FIG. 4. FIG. 4 is a diagram illustrating a screen capture of editing workflow in accordance with an embodiment of the present invention. The business administrator may also define various options, such as valid lists of values, minimum, and maximum values, formatting of the onscreen data, translation of onscreen values to database values, and data present requirements, as depicted in FIG. 5. FIG. 5 is a diagram illustrating a screen capture of adding options in accordance with an embodiment of the present invention. The business administrator may then complete the addition of the step to the application by pressing OK 500. The screen may then return to that as depicted by FIG. 2, and focus may then be put back on the add step button 200 so that steps can continue to bed added quickly without using a mouse.

Workflow may also be authored using a point and click interface. Each step can contain an unlimited series of workflow elements that will fire when the step is validating the input from the user or after the step has accepted the value. Each workflow element may be configured via an onscreen wizard without coding or compiling. The workflow may be authored on an individual step or on the application, and can also be authored for server side functionality. Workflow may also be rearranged using the point and click interface and new workflow can be inserted or added.

In accordance with an embodiment of the present invention, an extensible workflow model may be provided. The workflow function may be built upon a defined standardized interface. Implementing a class with this interface will make it available as a workflow. A workflow function or series of workflow functions can be compiled into a single workflow file (e.g., *.dll). Upon startup, the user device may look for these *.dll files and instantiate an instance of the function class. If a task uses the workflow in one of the *.dll's, the instantiated object may be called to perform the function. Any workflow function files loaded as plugins to the system may be automatically distributed to the mobile clients and available locally for authoring. Workflow functions can be optionally licensed, preventing use without payment for the function(s).

In accordance with an embodiment of the present invention, automatic device driver discovery may be provided. For steps that capture rich data types from external devices such as barcode scanners, magnetic stripe readers, and cameras, the system may automatically attempt to find the appropriate driver for the platform and device. A device driver may be built upon a standardized interface. Implementing a class with this interface will make it available as a device for input (or output). A device driver or series of drivers can be compiled into a single driver file (e.g., *.dll). Any device drivers loaded as plugins to the system may be automatically distributed to the mobile clients and available locally. Device drivers can be optionally licensed preventing use without payment for the drivers. Device drivers can be created to support any type of device imaginable, including barcode scanners, magnetic stripe readers, cameras, file attachments, sketches, digital signatures, biometric capture devices, RFID devices, and printers.

After deployment of the project to the mobile computer, the client software may run the application using the Business Rules Runtime Engine. This Engine may be available for all platforms and ensure consistency between the runtime environments. Applications can then run and collect data within the local database to provide for disconnected access to the application (by default). Applications can also optionally request data to a connected live server (connected or hybrid). As input into steps is received, a workflow may fire and be run. Any workflow that requires an immediate connection back to the central server data may have the request brokered to the database engine for processing. If a step contains a rich data type, the appropriate device driver for the platform and device is selected if available.

The Synchronization Module may pass data objects with encoded structured methods, logic, and workflow to be interpreted, displayed, and enforced on the mobile computing device. The mobile computing device then interprets the data object's actionable state, displays a user interface, manages business data, method, logic, and workflow and creates results (in the form of results objects). These results objects may contain an abstraction of the data captured on the mobile device in response to requests by the data object's embedded business processes. The results objects mat then be transferred back to the server and used for display, reporting, and driving diverse enterprise applications.

Applications that are run can be put on hold for completion later, and multiple applications may run simultaneously, subject to the processing power and memory availability of the mobile computer. Furthermore, application definitions may be cached for efficiency in rerunning the same application. The screen layout to use for the application may be determined using intelligent rendering, which will be described in more detail later. If there is a matching screen layout for the platform and language, it may be used. If there is a matching screen layout for the platform, but not the language, a default (e.g., English) may be used. If there is neither a machine layout for the platform or the language, one will be automatically generated in English for the current platform using intelligent rendering.

Each step captured may be time stamped with the collection date for the step, for later use. Each application instance may receive a unique identification to ensure its uniqueness system-wide. Any completed applications may have their results stored in the local database. Completed applications may then synchronize with the server to provide the results.

Enterprise data may be object-oriented. It can exist locally, externally, or virtually. Any object instance can be related to any other object instance. Enterprise data may be used in projects to define a subset of the information available to an application running on the mobile device. The central enterprise data may then optionally be queried remotely from the application in the field.

Projects comprise one or more tasks, the users they should be deployed to, and/or any enterprise data used by the tasks. Projects may also comprise scheduling options that determine when to deploy or rescind the project and its applications and data. These events occur whether the administration tool is running or not. Results of the applications that have been synchronized with the server can then be viewed by the business administrator per project or per task, using the administration tool. The results may also be exported into third party applications such as spreadsheet programs or word processors. Statistics regarding the deployment may also be available, on a per user, per application, or per project basis.

In an embodiment of the present invention, changes to a project may be automatically synchronized to the client software to allow for on-the-fly deployments of changes to applications or workflows. The updates may be integrated into projects immediately upon synchronization, regardless of whether the project is currently running or not. This creates a bi-directional data flow between the business administrators and the mobile workers that exists for the life of the project. Additionally, smart synchronization features may be provided that intelligently synchronize the information and monitor the features and attributes.

Smart synchronization may synchronize or remove projects based on deployment configuration. It may send all data associated or needed by a project automatically, and remember what data was sent to avoid redundancy and decrease synchronization times. Data sent for expired projects may be automatically cleaned up on the mobile device. Any plug-ins (e.g., workflow functions or new device drivers) may be automatically distributed to the correct device. Additionally, any system or software updates (such as new features or bug fixes) may also be automatically distributed to the correct device and set up for automatic installation. This also includes database updates. In an embodiment of the present invention, while the database schema is identical between the database and the client, only project and enterprise data relating to the current mobile worker's currently active projects is downloaded to the mobile device during synchronization.

In an embodiment of the present invention, a proprietary binary format may be used in communication payloads which yields better efficiency, security, and footprint. This proprietary format may include only bytes of serialized objects along with object types. By storing these serialized objects in binary form, the overhead of XML or other languages can be avoided and the total number of byes in the entire transmission is much smaller.

Smart Synchronization may automatically occur whenever an IP address is present (e.g., devices is cradled, on an 802.11 network, on a GPRS network, or connected via a network card or modem). This allows mobile devices to be updated in a manner that ensures as best as possible that projects on the mobile devices are the latest versions of the projects. Intelligent caching of data on the server may be performed to maximize scalability and throughput. Smart synchronization may also act as a scheduler for projects set up by an administration tool. Smart synchronization may also log its synchronization activities and provide multiple levels of log detail for administrators to view.

Additionally, Smart Synchronization may act as a liaison for remote access to the central database by mobile devices requesting access to live data. It may also act as a communications hub for any messaging between the mobile devices and/or the central administrators.

In an embodiment of the present invention, smart synchronization may include continuous delta synchronization. Here, the changes to enterprise data, system files, projects, tasks, metadata, etc. are proliferated to the client devices during synchronization. This provides for on-the-fly changes to be made and realized in the field. When a project expires or is canceled, the project and all of its related data may be automatically removed from the clients during the next synchronization. If desired, the synchronization records for a device or user can be reset, causing a full re-send of all data appropriate for that user and device.

Figure 6:
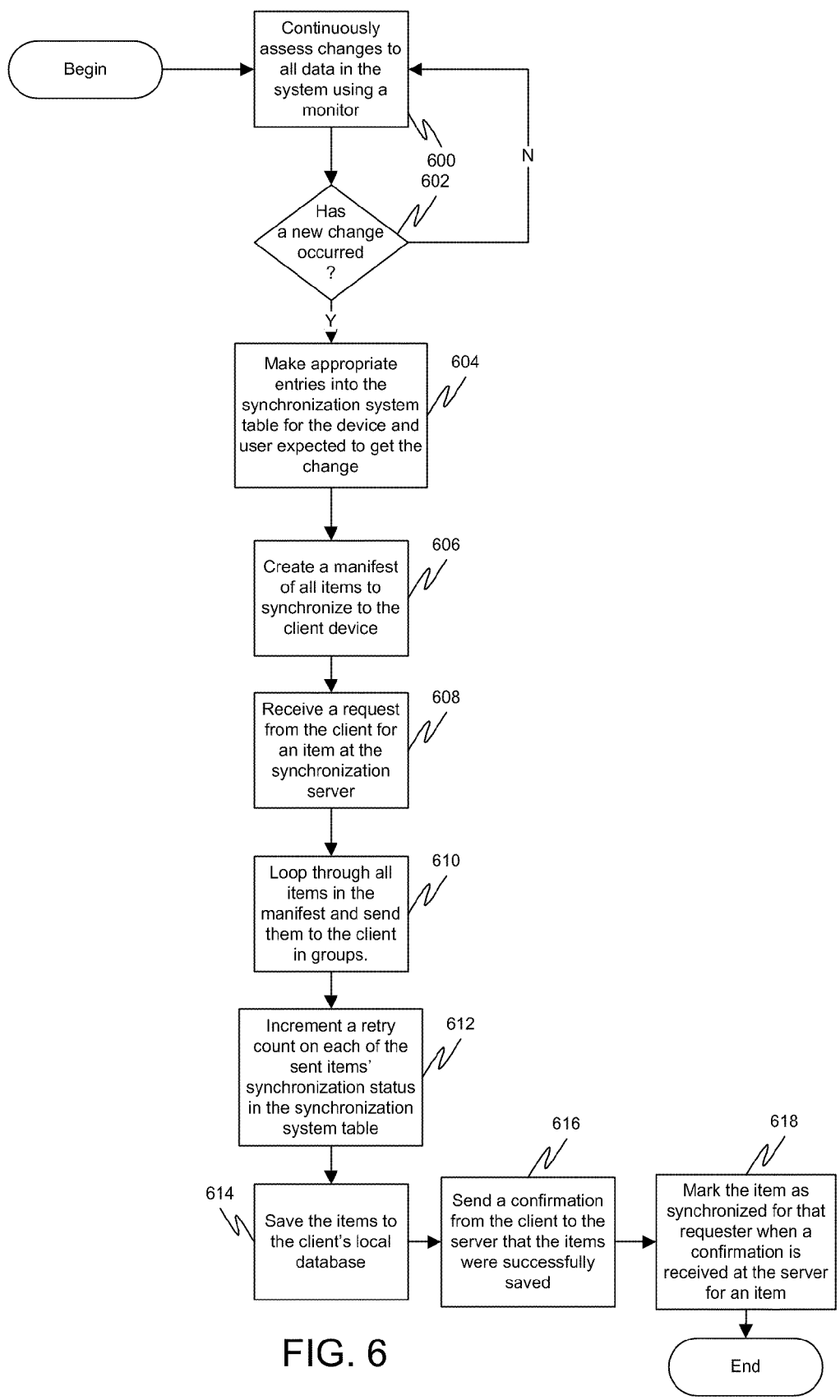
FIG. 6 is a flow diagram illustrating continuous delta synchronization in accordance with an embodiment of the present invention.

FIG. 6 is a flow diagram illustrating continuous delta synchronization in accordance with an embodiment of the present invention. Each act of this method may be performed by software, hardware, or any combination thereof. A system table may contain all items that need to be synchronized for a particular device and user. Additionally, objects, including administrator-defined or system objects, may have system fields that designate the last time that object was changed and who changed it. It should be noted that deletion of an item may also be considered a change. At 600, the monitor may continually assess changes to all data in the system. At 602, it may be determined if a new change is discovered. If so, then at 604, the monitor may make appropriate entries into the synchronization system table for the device and user expected to get those changes. At 606, the synchronization server may create a manifest of all items to synchronize to the client device. This may be created based on information in the synchronization system table. It may be created upon receipt of a synchronization request from the mobile computing device, which may be generated upon the detection a network address for the mobile computing device by the synchronization server. In order for an item to be included in the manifest, it should pass the following tests:

1. The user should be a current valid user
2. The device should be a current valid device
3. The item should be designated to go to the requester
4. The item should be designated as not yet received by the requester
5. The item should have a retry count below a set number if not received by the requester. This set number is configurable.

At 608, the client may request an item from the synchronization server. At 610, the synchronization server may loop through all the items in the manifest and send them to the client in groups. The size of the group is configurable. At 612, the server may increment a retry count on each of the sent items' synchronization status in the synchronization system table.

At 614, the client may then save the items to the local database. At 616, the client may send a confirmation back to the server that the items were successfully saved. If the client sees that it already has the most recent version of an item, it may simply confirm the item without requesting it. At 618, when the server receives a confirmation request, it may mark the item as synchronized for that requester in the synchronization system table. If an error occurs on the client during processing, the error information may be sent to the synchronization server for logging on the server. The log may include the user, device, and timestamp information. Server side synchronization errors may also be logged.

Figure 7:
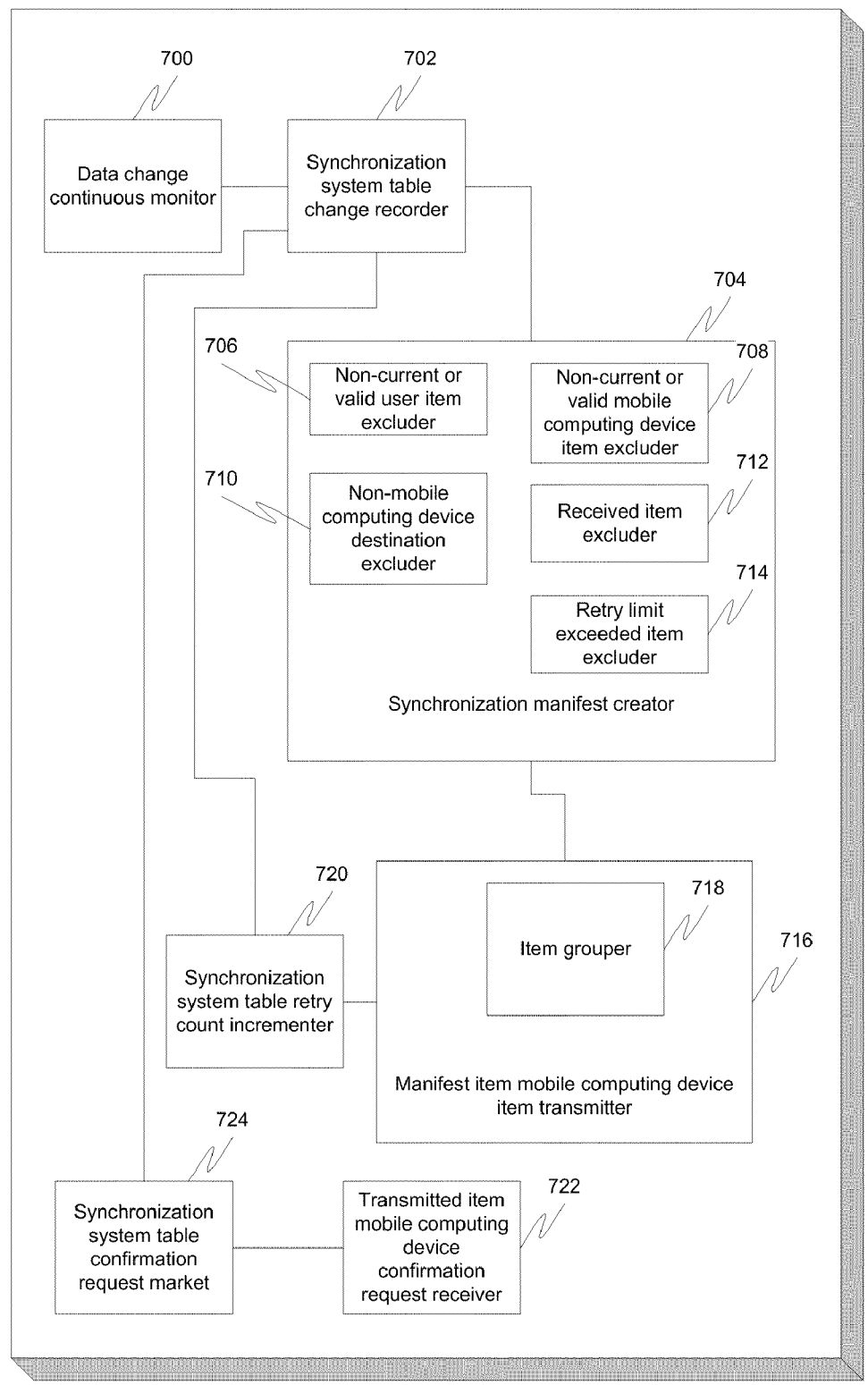
FIG. 7 is a block diagram illustrating an apparatus for intelligently synchronizing a central server with a mobile computing device in accordance with an embodiment of the present invention.

FIG. 7 is a block diagram illustrating an apparatus for intelligently synchronizing a central server with a mobile computing device in accordance with an embodiment of the present invention. Each element in this apparatus may be embodied in software, hardware, or any combination thereof. A data change continuous monitor 700 may continuously monitor changes to data in the central server. A synchronization system table change recorder 702 coupled to the data change continuous monitor 700 may, upon discovery of a change relevant to the mobile computing device, note the change in a synchronization system table corresponding to the mobile computing device, the synchronization system table containing all items that need to be synchronized for the mobile computing device. A synchronization manifest creator 704 coupled to the synchronization system table change recorder 702 may create a manifest of all items to synchronize with the mobile computing device, the creating based upon information in the synchronization system table. The synchronization manifest creator 704 may include a series of components designed to ensure that only the proper items be added to the manifest. This includes a non-current or valid user item excluder 706 which excludes an item from the manifest if the item corresponds to a user who is not a current valid user. A non-current or valid mobile computing device item excluder 708 may exclude an item from the manifest if the item corresponds to a mobile computing device that is not a current valid mobile computing device. A non-mobile computing device destination item excluder 710 may exclude an item from the manifest if the item is not designated to go to the mobile computing device. A received item excluder 712 may exclude an item from the manifest if the item has been designated as received by the mobile computing device. Finally, a retry limit exceeded item excluder 714 may exclude an item from the manifest if the item has an associated retry count equal to or greater than a preconfigured retry limit.

A manifest item mobile computing device item transmitter 716 coupled to the synchronization manifest creator 704 may transmit the items in the manifest to the mobile computing device. This may include transmitting the items in groups by continuously looping through the manifest using an item grouper 718. A synchronization system table retry count incrementer 720 coupled to the manifest item mobile computing device item transmitter 716 and to the synchronization system table change recorder 702 may increment a retry count in the synchronization system table for each transmitted item. A transmitted item mobile computing device confirmation request receiver 722 may receive a confirmation request from the mobile computing device for one or more transmitted items. Finally, a synchronization system table confirmation request marker 724 coupled to the transmitted item mobile computing device confirmation request receiver 722 and to the synchronization system table change recorder 702 may mark each of the one or more transmitted items for which a confirmation request has been received as synchronized in the synchronization system table.

Figure 8:
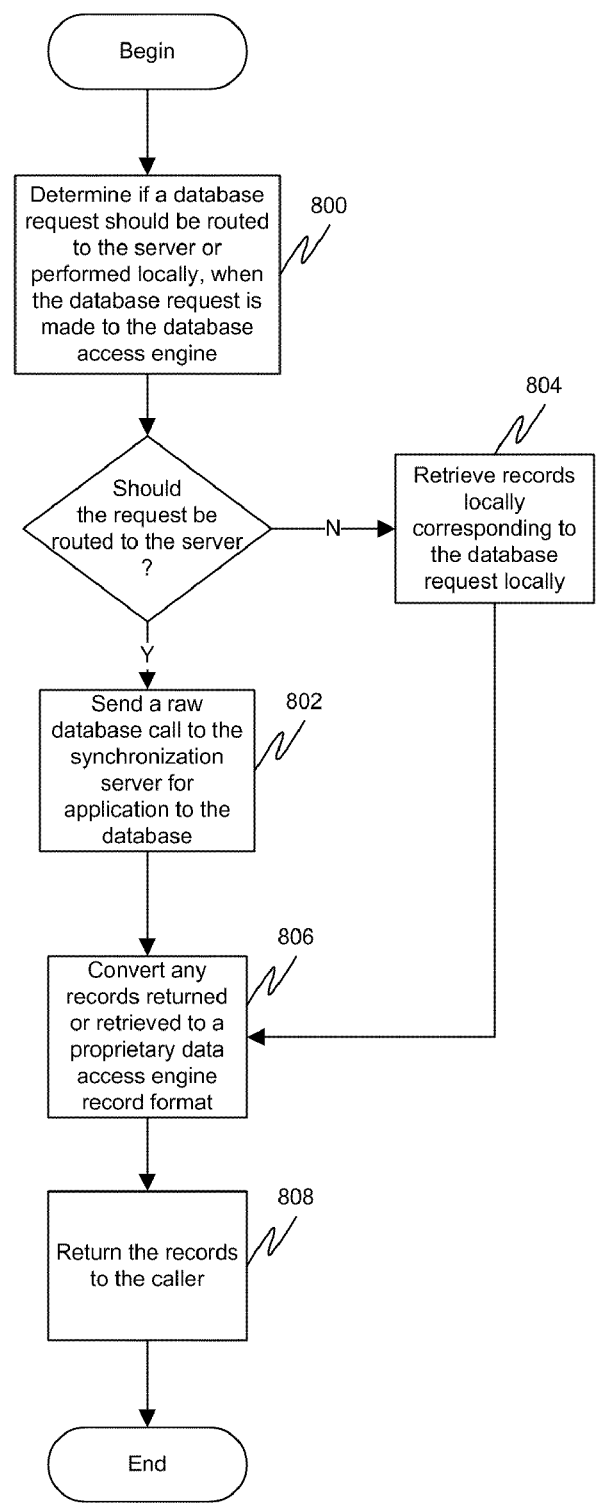
FIG. 8 is a flow diagram illustrating handling a remote access request in accordance with an embodiment of the present invention.

The synchronization server supports the ability to proxy database requests to its database. Requests for remote access may be made via known web service calls by the database access engine. FIG. 8 is a flow diagram illustrating handling a remote access request in accordance with an embodiment of the present invention. Each act of this method may be performed by software, hardware, or any combination thereof. At 800, when a database request is made to the database access engine, the database access engine determines if the request should be routed to the server or performed locally. If it is to be routed to the server, then at 802 a raw database call (such as a SQL call) may be sent to the synchronization server for application to the database. If not, then at 804, records corresponding to the database request may be retrieved locally. At 806, any records returned or retrieved may be converted to a proprietary database access engine record format. At 808, the database access engine may return the records to the caller. Any returned records may be converted to an internal proprietary record format similar to that utilized for communications as described above. Namely, the records may be serialized and stored in binary form for transmission as opposed to using a web language such as XML, which adds overhead.

The synchronization server supports the ability to receive or send communication requests to other users or administrators of the server. Requests for pending messages and requests to send messages may be made via known web service calls. Messages may be stored in a proprietary format that supports the ability to send partially complete tasks to other users, messages, attachments, etc. This proprietary format may be similar to that utilized for communications as described above. Namely, the communications may be serialized and stored in binary form for transmission as opposed to using a web language such as XML, which adds overhead.

Figure 9:
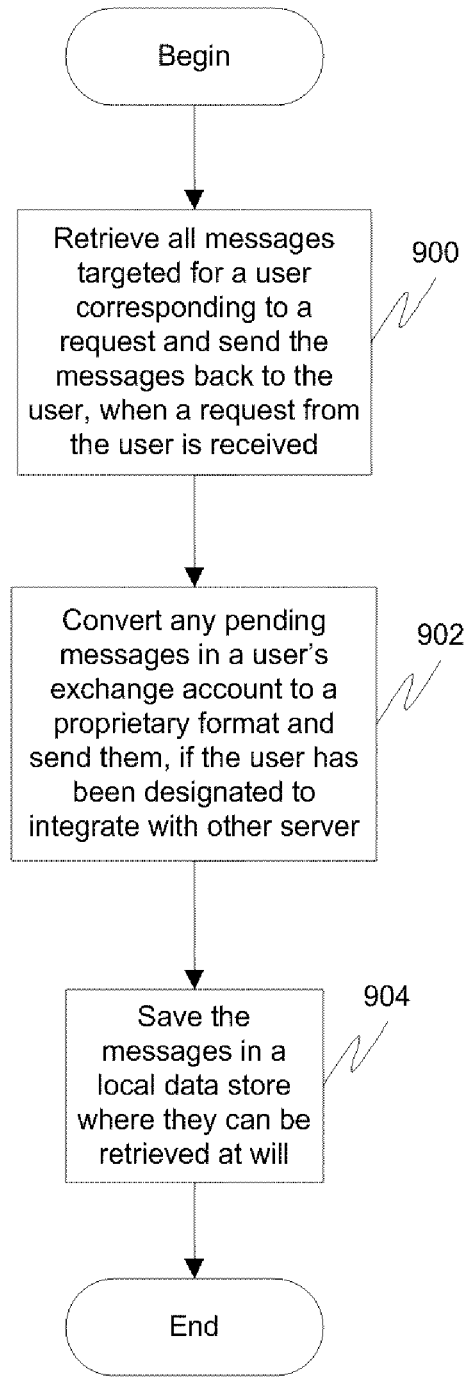
FIG. 9 is a flow diagram illustrating handling a request for pending messages in accordance with an embodiment of the present invention.

Messages may be stored in a system table. FIG. 9 is a flow diagram illustrating handling a request for pending messages in accordance with an embodiment of the present invention. Each act of this method may be performed by software, hardware, or any combination thereof. At 900, when a request is received, all messages targeted for that user may be retrieved from the database and sent back. At 902, if the user has been designated to integrate with another servers, such as a Microsoft Exchange server, any pending messages in their exchange account may be converted to the proprietary format and sent. At 904, the messages may then be saved in a local data store where they can be retrieved at will.

Figure 10:
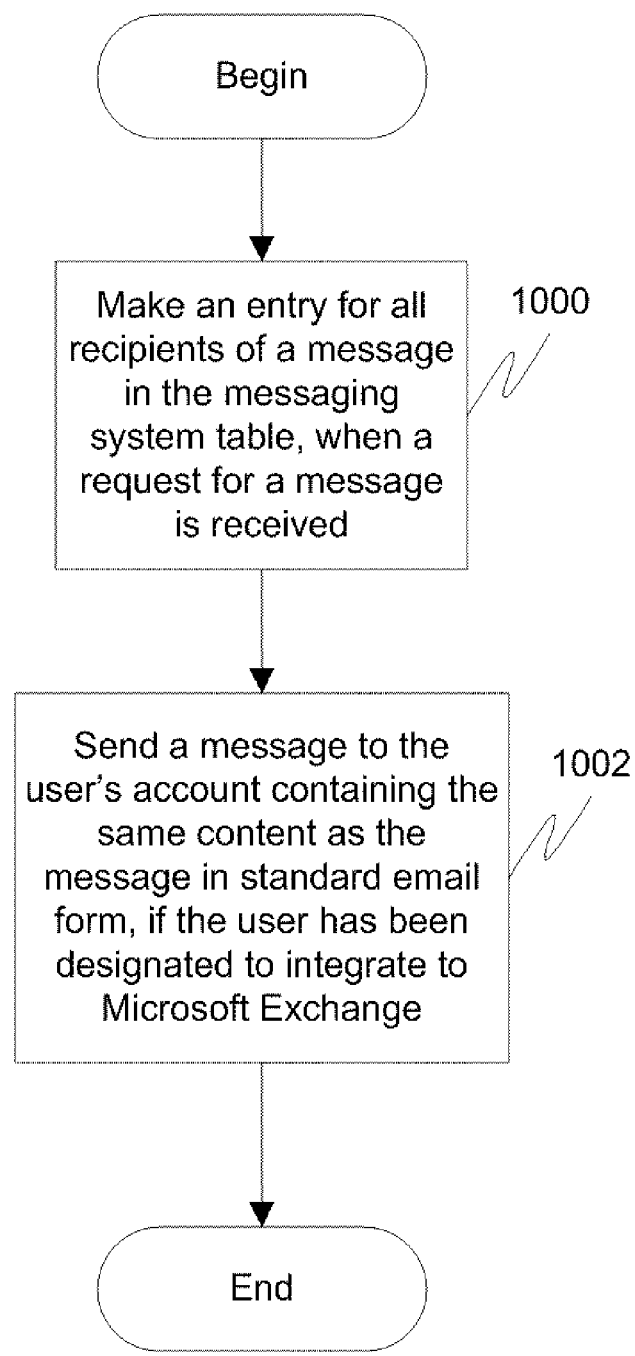
FIG. 10 is a flow diagram illustrating handling a request to send a message in accordance with an embodiment of the present invention.

FIG. 10 is a flow diagram illustrating handling a request to send a message in accordance with an embodiment of the present invention. Each act of this method may be performed by software, hardware, or any combination thereof. At 1000, when the request is received, all recipients may have an entry made for the message in the messaging system table. At 1002, if the user has been designated to integrate to Microsoft Exchange, their user account may have a message sent to it from the server containing the same content as the message in standard email form. An administration tool may be provided to allow for authoring and central management of applications. Through it, projects and deployments may be created, configured, and managed. Additionally, statistics can be viewed regarding deployments. Reports of results coming in from deployed applications may also be viewed. The administration tool may also provide for the management of plug-ins and system updates, as well as the creation, configuration, exploration, import/export, and management of enterprise data, and user administration, including security and LDAP integration, as well as license administration.

In an embodiment of the present invention, intelligent rendering may be utilized to create content to places on a screen according to various aspects of the device on which it is to be rendered. Therefore, for example, the system may automatically create a screen set appropriate for a PocketPC device or a Windows device. The Administrator may override this by creating a custom screen.

Figure 11:
FIG. 11 is a diagram illustrating an example of a screen automatically rendered on a PocketPC device in accordance with an embodiment of the present invention.
Figure 11:
Figure 12:
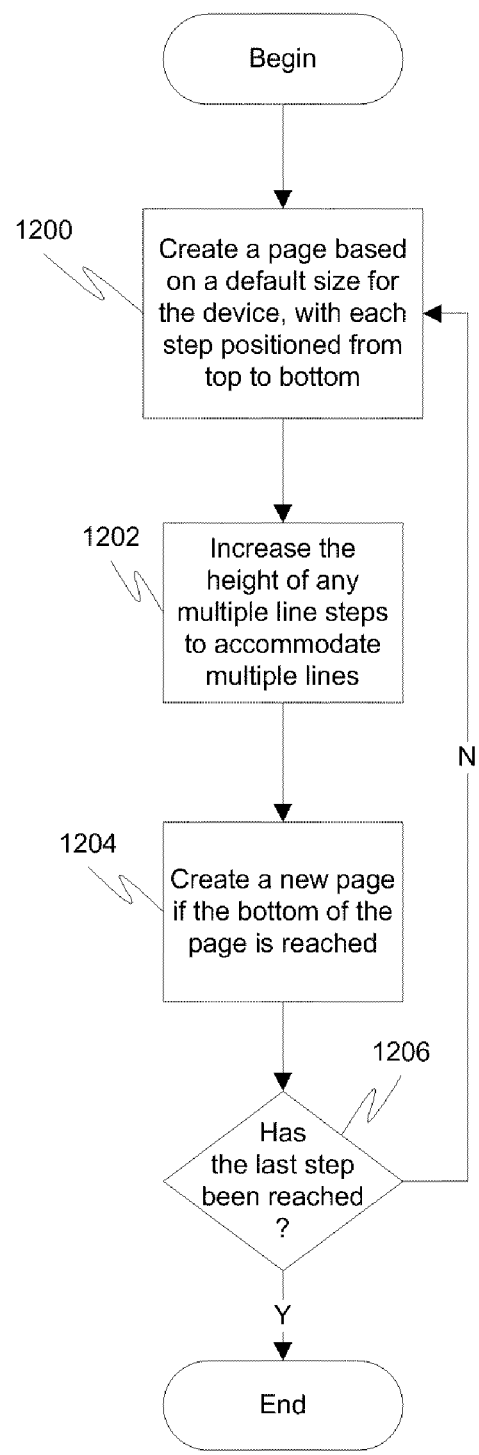
FIG. 12 is a flow diagram illustrating a method for automatically rendering a PocketPC screen in accordance with an embodiment of the present invention.

On PocketPCs, screens may be created in a linear fashion and paginated so that scroll bars are unnecessary. As such, it may be necessary to split the information over two or more pages. FIG. 11 is a diagram illustrating an example of a screen automatically rendered on a PocketPC device in accordance with an embodiment of the present invention. FIG. 12 is a flow diagram illustrating a method for automatically rendering a PocketPC screen in accordance with an embodiment of the present invention. Each act of this method may be performed by software, hardware, or any combination thereof. At 1200, a page may be created based on a default size for the device, with each step positioned from top to bottom. The default size may be set by the administrator. At 1202, any multiple line steps may have their height increased to accommodate multiple lines. At 1204, if the bottom of the page is reached, a new page may be created and the process may continue from the top of the new page. At 1206, once the last step is reached, the screen may be considered finished.

Figure 13:
FIG. 13 is a diagram illustrating an example of screen automatically rendered on a TabletPC/Windows screen in accordance with an embodiment of the present invention.
Figure 14:
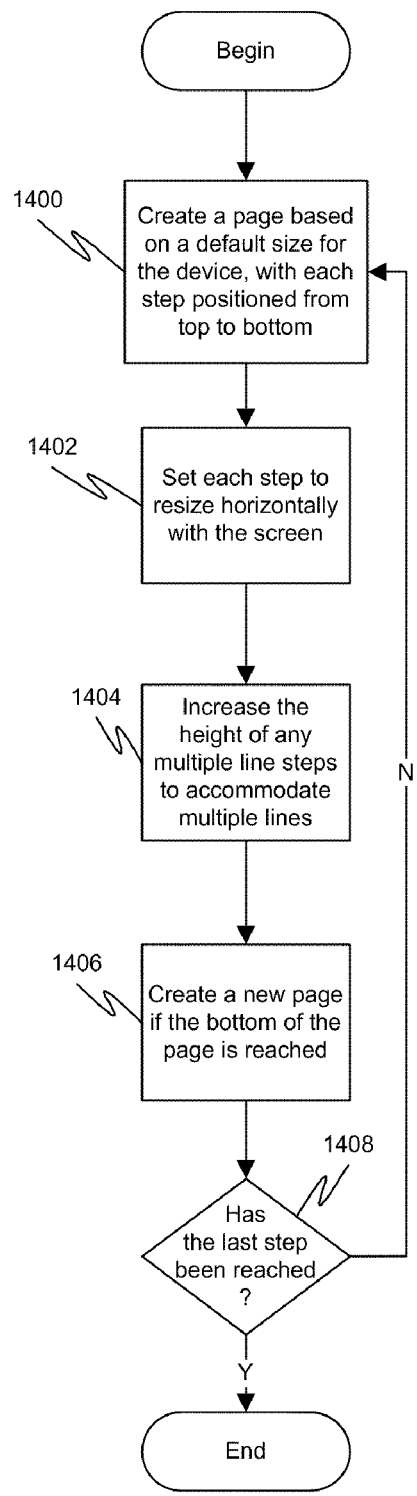
FIG. 14 is a flow diagram illustrating a method for automatically rendering a TabletPC/Windows screen in accordance with an embodiment of the present invention.

On TabletPC or Windows devices, the screens may be generated in a resizable format so that scroll bars are unnecessary. FIG. 13 is a diagram illustrating an example of screen automatically rendered on a TabletPC/Windows screen in accordance with an embodiment of the present invention. FIG. 14 is a flow diagram illustrating a method for automatically rendering a TabletPC/Windows screen in accordance with an embodiment of the present invention. Each act of this method may be performed by software, hardware, or any combination thereof. At 1400, a page may be created based on a default size for the device, with each step positioned from top to bottom. The default size may be set by the administrator. At 1402, each step may be set to resize horizontally with the screen. At 1404, any multiple line steps may have their height increased to accommodate multiple lines. At 1406, if the bottom of the page is reached, a new page may be created and the process may continue from the top of the new page. At 1408, once the last step is reached, the screen may be considered finished.

For all platforms, a default TabletPC/Windows and PocketPC layout may be created in English. The system also allows for customized screens which provide the following feature set:

1. Steps can be positioned anywhere
2. Steps can be sized to any size
3. Steps can be anchored to justify to the bottom or right of the form.
4. Steps can be anchored to resize their width or height with the form.
5. Forecolor, Backcolor, Read-Only status, enabled status, and visible status can all be set for each step.
6. An infinite number of pages can be used
7. Graphical trim such as labels, lines, rectangles, group boxes, and images can be placed on the page.
8. Multiple layouts for separate devices, including printing layouts, may be kept together but authored separately.
9. Each page's background color and size ability can be set.
10. If the page is set not to resize with the client, scroll bars may be automatically added at runtime to allow the user to continue to use all pages.

Figure 15:
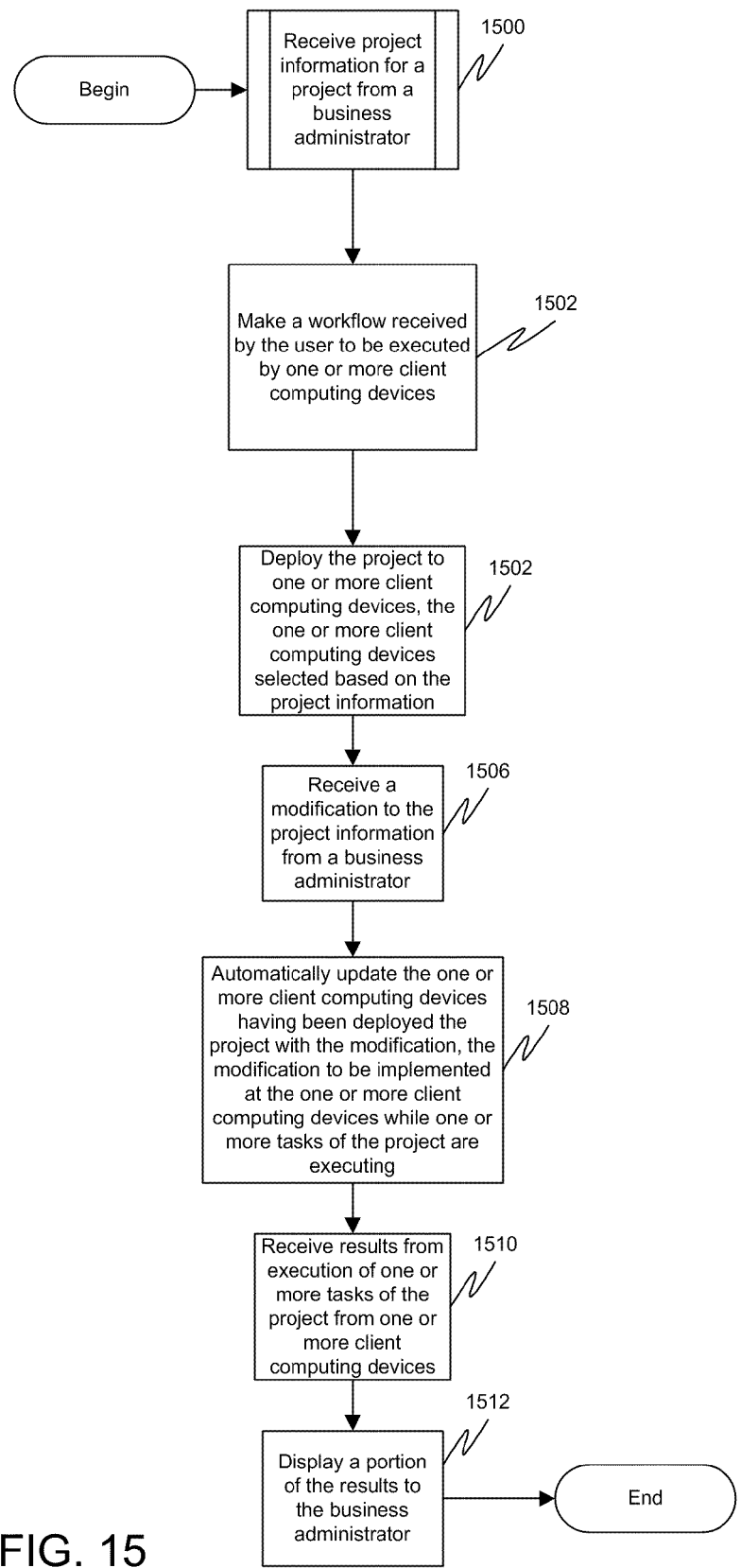
FIG. 15 is a flow diagram illustrating a method for deploying projects to one or more client computing devices from a server in accordance with an embodiment of the present invention.

FIG. 15 is a flow diagram illustrating a method for deploying projects to one or more client computing devices from a server in accordance with an embodiment of the present invention. Each act of this method may be performed by software, hardware, or any combination thereof. Each of the projects may include one or more tasks. Each of the tasks may include one or more data gathering steps. At 1500, the server may receive project information for a project from a business administrator. This may include receiving a prompt for data, a type of data expected, and a type of input mechanism for data for each step in a task. It may also include receiving workflow to be fired from a step, as well as options to be set for a step, such as name, default value, range of numeric values or string lengths allowed, lists, and format. At 1502, a workflow received by the server may be made available to be executed by one or more client computing devices. At 1504, the project may be deployed to one or more client computing devices, the one or more client computing devices selected based on the project information. At 1506, a modification to the project information may be received from a business administrator. At 1508, the one or more client computing devices having been deployed the project may be automatically updated with the modification, the modification to be implemented at the one or more client computing devices while one or more tasks of the project are executing. At 1510, results may be received from execution of one or more tasks of the project from one or more client computing devices. At 1512, a portion of the results may be displayed to the business administrator.

Figure 16:
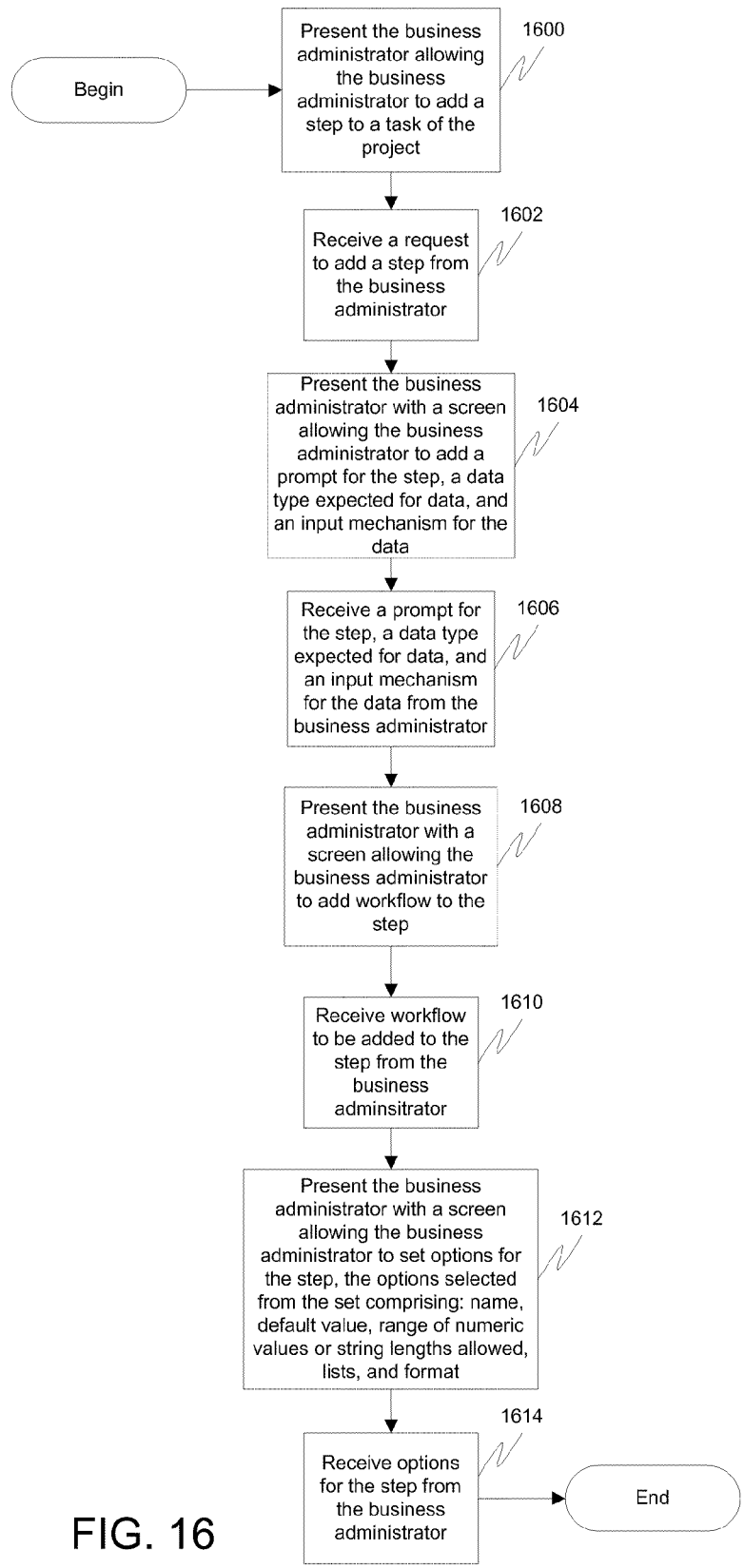
FIG. 16 is a flow diagram illustrating a method for receiving project information for a project from a business administrator in accordance with an embodiment of the present invention.

FIG. 16 is a flow diagram illustrating a method for receiving project information for a project from a business administrator in accordance with an embodiment of the present invention. Each act of this method may be performed by software, hardware, or any combination thereof. FIG. 16 represents 1500 of FIG. 15 in more detail. At 1600, the business administrator may be presented with a screen allowing the business administrator to add a step to a task of the project. At 1602, a request to add a step may be received from the business administrator. At 1604, the business administrator may be presented with a screen allowing the business administrator to add a prompt for the step, a data type expected for data, and an input mechanism for the data. At 1606, a prompt for the step, a data type expected for data, and an input mechanism for the data may be received from the business administrator. At 1608, the business administrator may be presented with a screen allowing the business administrator to add workflow to the step. At 1610, workflow to be added to the step may be received from the business administrator. At 1612, the business administrator may be presented with a screen allowing the business administrator to set options for the step, the options selected from the set comprising: name, default value, range of numeric values or string lengths allowed, lists, and format. At 1614, options for the step may be received from the business administrator.

Figure 17:
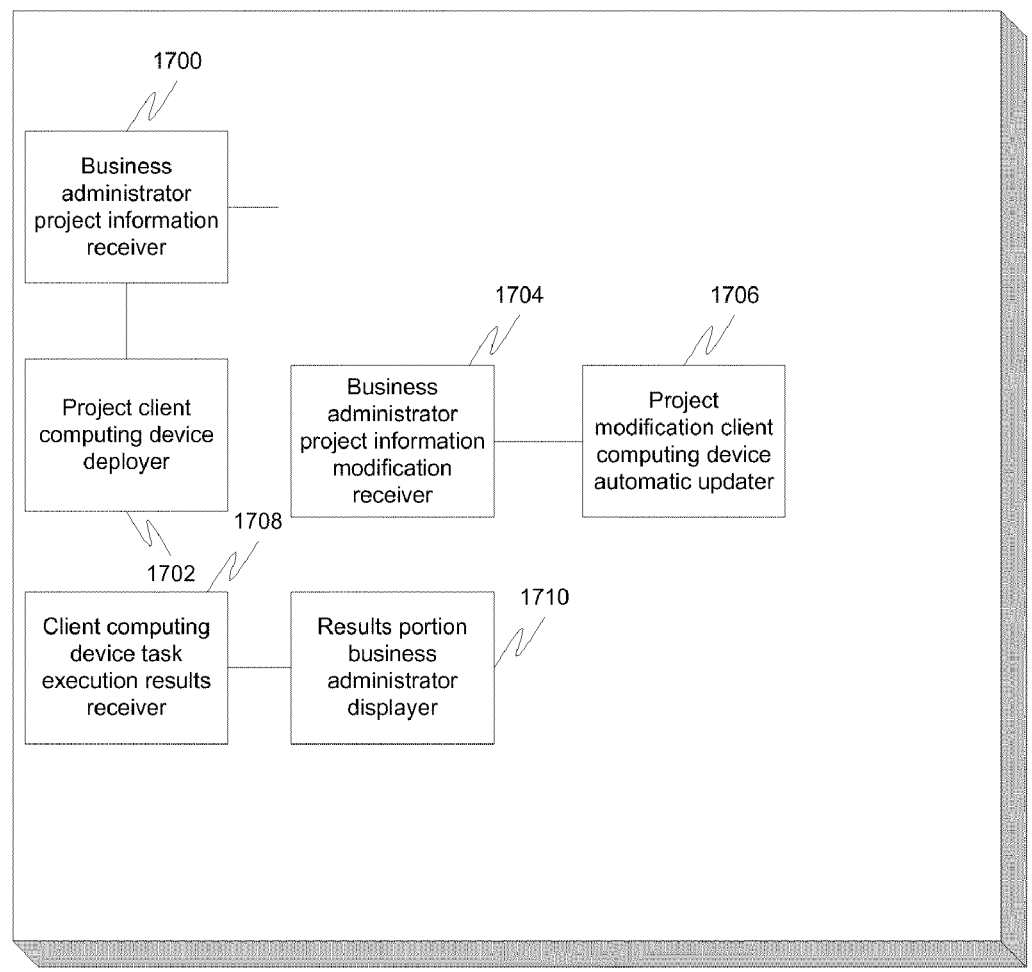
FIG. 17 is a block diagram illustrating an apparatus or deploying projects to one or more client computing devices from a server in accordance with an embodiment of the present invention.

FIG. 17 is a block diagram illustrating an apparatus or deploying projects to one or more client computing devices from a server in accordance with an embodiment of the present invention. Each element in this apparatus may be embodied in software, hardware, or any combination thereof. Each of the projects may include one or more tasks. Each of the tasks may include one or more data gathering steps. A business administrator project information receiver 1700 may receive project information for a project from a business administrator. This may include receiving a prompt for data, a type of data expected, and a type of input mechanism for data for each step in a task. It may also include receiving workflow to be fired from a step, as well as options to be set for a step, such as name, default value, range of numeric values or string lengths allowed, lists, and format. A project client computing device deployer 1702 coupled to the business administrator project information receiver 1700 may deploy the project to one or more client computing devices, the one or more client computing devices selected based on the project information. A business administrator project information modification receiver 1704 may receive a modification to the project information from a business administrator. A project modification client computing device automatic updater 1706 coupled to the business administrator project information modification receiver 1704 may automatically update the one or more client computing devices having been deployed the project with the modification, the modification to be implemented at the one or more client computing devices while one or more tasks of the project are executing. A client computing device task execution results receiver 1710 may receive results from execution of one or more tasks of the project from one or more client computing devices. A results portion business administrator displayer 1712 coupled to the client computing device task execution results receiver 1710 may display a portion of the results to the business administrator.

Figure 18:
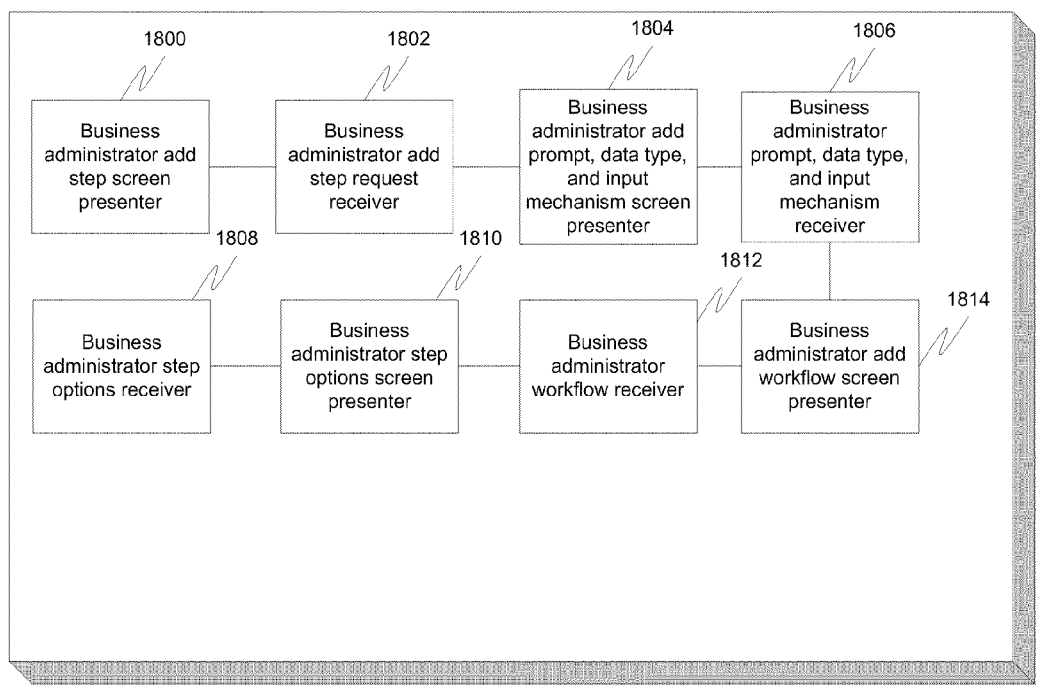
FIG. 18 is a block diagram illustrating a business administrator project information receiver in accordance with an embodiment of the present invention.

FIG. 18 is a block diagram illustrating a business administrator project information receiver in accordance with an embodiment of the present invention. Each element in this apparatus may be embodied in software, hardware, or any combination thereof. FIG. 18 represents 1700 of FIG. 17 in more detail. A business administrator add step screen presenter 1800 may present the business administrator with a screen allowing the business administrator to add a step to a task of the project. A business administrator add step request receiver 1802 coupled to the business administrator add step screen presenter 1800 may receive a request to add a step from the business administrator. A business administrator add prompt, data type, and input mechanism screen presenter 1804 coupled to the business administrator add step request receiver 1802 may present the business administrator with a screen allowing the business administrator to add a prompt for the step, a data type expected for data, and an input mechanism for the data. A business administrator prompt, data type, and input mechanism receiver 1806 coupled to the business administrator add prompt, data type, and input mechanism screen presenter 1804 may receive a prompt for the step, a data type expected for data, and an input mechanism for the data from the business administrator. A business administrator add workflow screen presenter 1808 coupled to the business administrator prompt, data type, and input mechanism receiver 1806 may present the business administrator with a screen allowing the business administrator to add workflow to the step. A business administrator workflow receiver 1810 coupled to the business administrator add workflow screen presenter 1808 may receive workflow to be added to the step from the business administrator. A business administrator step options screen presenter 1812 coupled to the business administrator prompt, data type, and input mechanism receiver 1806 may present the business administrator with a screen allowing the business administrator to set options for the step, the options selected from the set comprising: name, default value, range of numeric values or string lengths allowed, lists, and format. A business administrator step options receiver 1814 coupled to the business administrator step options screen presenter 1812 may receive options for the step from the business administrator.

Figure 19:
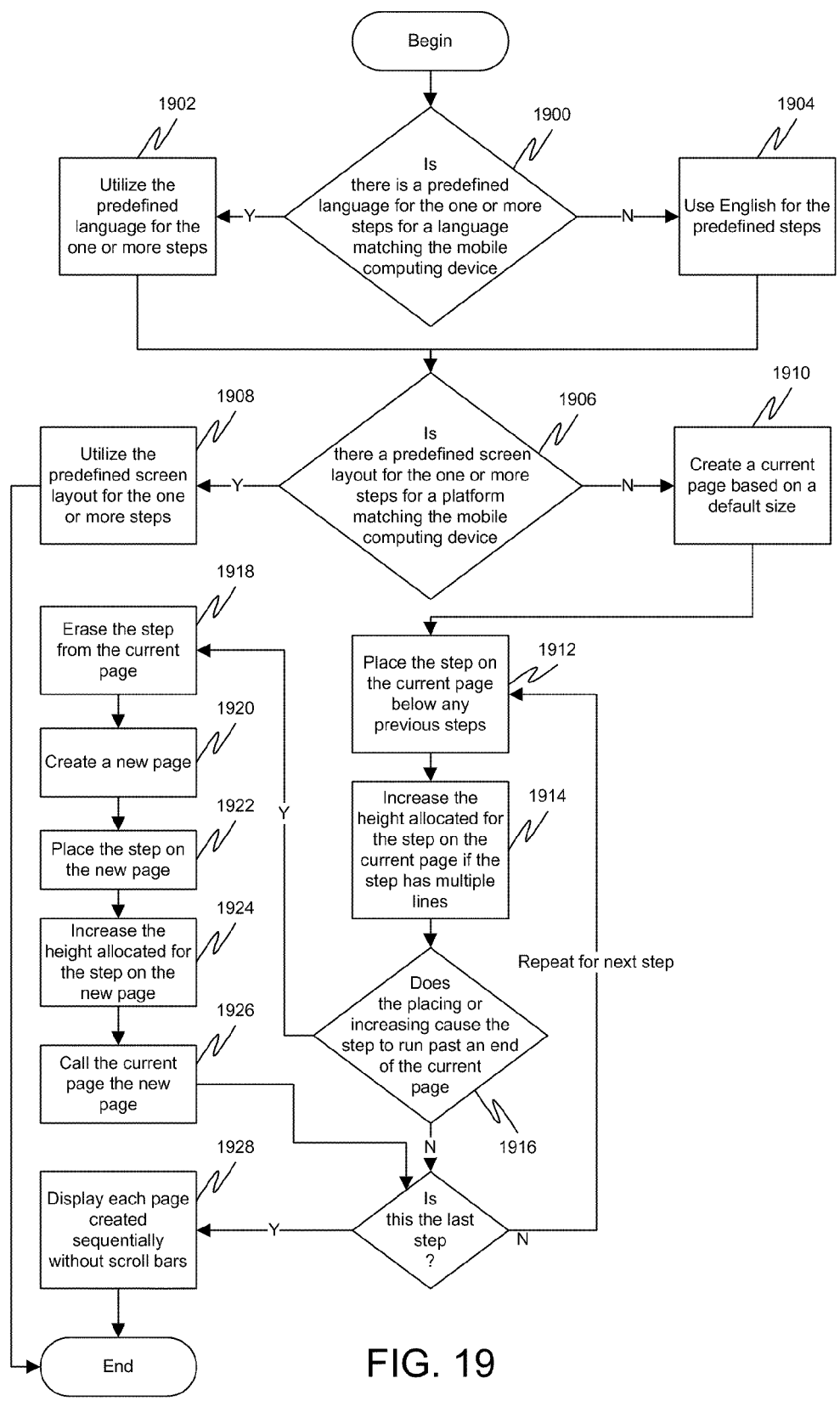
FIG. 19 is a flow diagram illustrating a method for providing a user interface for execution of one or more steps on a mobile computing device in accordance with an embodiment of the present invention.

FIG. 19 is a flow diagram illustrating a method for providing a user interface for execution of one or more steps on a mobile computing device in accordance with an embodiment of the present invention. Each act of this method may be performed by software, hardware, or any combination thereof. In this embodiment, the PocketPC operating system or a similar operating system may be utilized. At 1900, it may be determined if there is a predefined language for the one or more steps for a language matching the mobile computing device. If so, then at 1902 the predefined language may be utilized for the one or more steps. If not, then at 1904, English may be utilized for the one or more steps. At 1906, it may be determined if there is a predefined screen layout for the one or more steps for a platform matching the mobile computing device. If so, then at 1908, the predefined screen layout may be utilized for the one or more steps. If not, then at 1910, a current page may be created based on a default size. Then the process may proceed into a loop for each of the one or more steps. In this loop, at 1912, the step may be placed on the current page below any previous steps. At 1914, a height allocated for the step on the current page may be increased if the step has multiple lines. At 1916, it may be determined if the placing and/or increasing causes the step to run past an end of the current page. If so, then at 1918, the step may be erased from the current page. Then, at 1920, a new page may be created. Then, at 1922 the step may be placed on the new page and at 1924 a height allocated for the step on the new page may be increased if the step has multiple lines. The new page may then be called the current page at 1926, at which point the process may loop back to 1912 for the next step. Finally, at 1928, each page created may be sequentially displayed without scroll bars.

Figure 20:
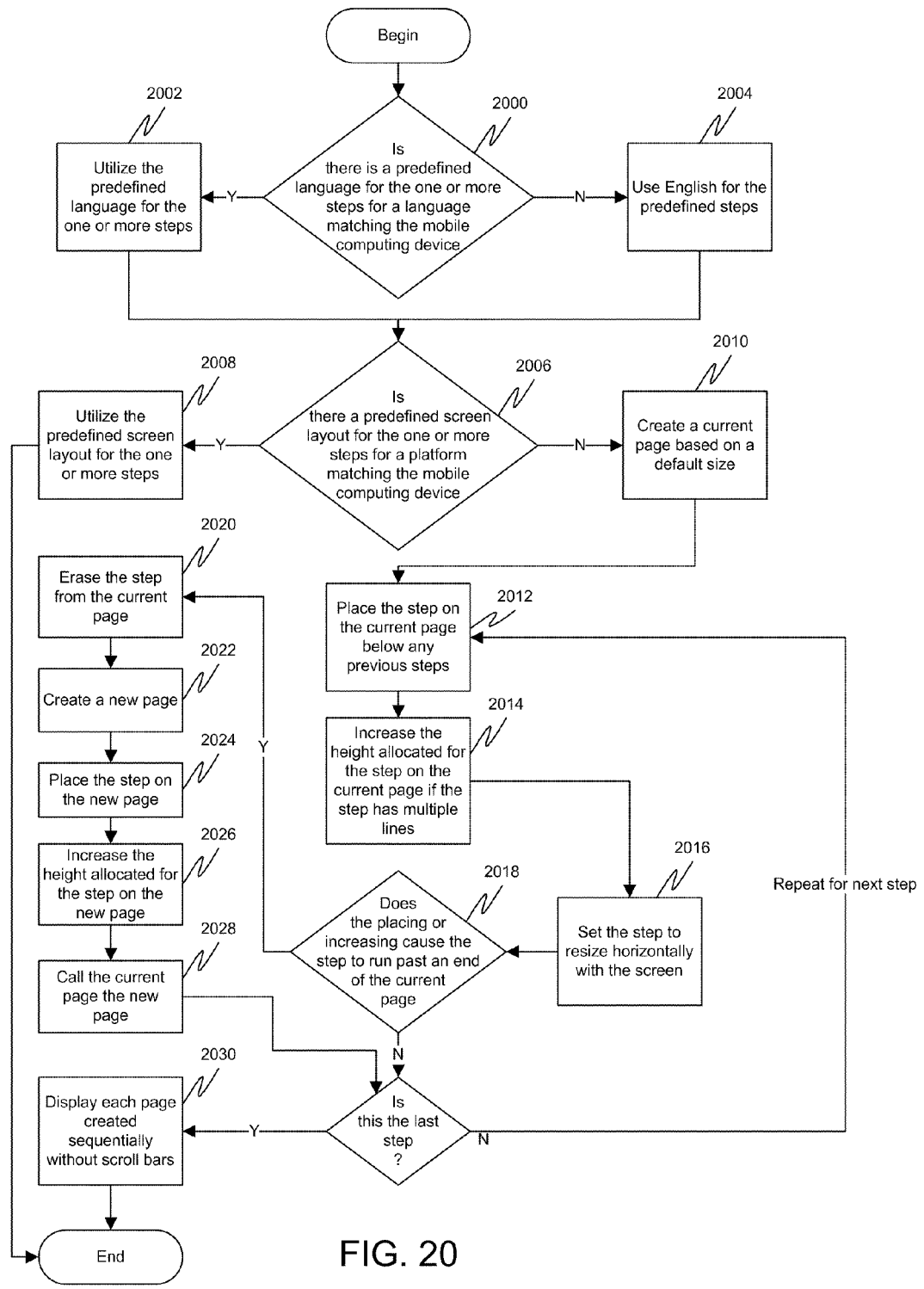
FIG. 20 is a flow diagram illustrating a method for providing a user interface for execution of one or more steps on a mobile computing device in accordance with an embodiment of the present invention. In this embodiment, the TabletPC or Windows operating system or a similar operating system may be utilized.

FIG. 20 is a flow diagram illustrating a method for providing a user interface for execution of one or more steps on a mobile computing device in accordance with an embodiment of the present invention. Each act of this method may be performed by software, hardware, or any combination thereof. In this embodiment, the TabletPC or Windows operating system or a similar operating system may be utilized. At 2000, it may be determined if there is a predefined language for the one or more steps for a language matching the mobile computing device. If so, then at 2002 the predefined language may be utilized for the one or more steps. If not, then at 2004, English may be utilized for the one or more steps. At 2006, it may be determined if there is a predefined screen layout for the one or more steps for a platform matching the mobile computing device. If so, then at 2008, the predefined screen layout may be utilized for the one or more steps. If not, then at 2010, a current page may be created based on a default size. Then the process may proceed into a loop for each of the one or more steps. In this loop, at 2012, the step may be placed on the current page below any previous steps. At 2014, a height allocated for the step on the current page may be increased if the step has multiple lines. At 2016, the step may be set to resize horizontally with the screen. At 2018, it may be determined if the placing and/or increasing causes the step to run past an end of the current page. If so, then at 2020, the step may be erased from the current page. Then, at 2022, a new page may be created. Then, at 2024 the step may be placed on the new page and at 2026 a height allocated for the step on the new page may be increased if the step has multiple lines. The new page may then be called the current page at 2028, at which point the process may loop back to 2012 for the next step. Finally, at 2030, each page created may be sequentially displayed without scroll bars.

Figure 21:
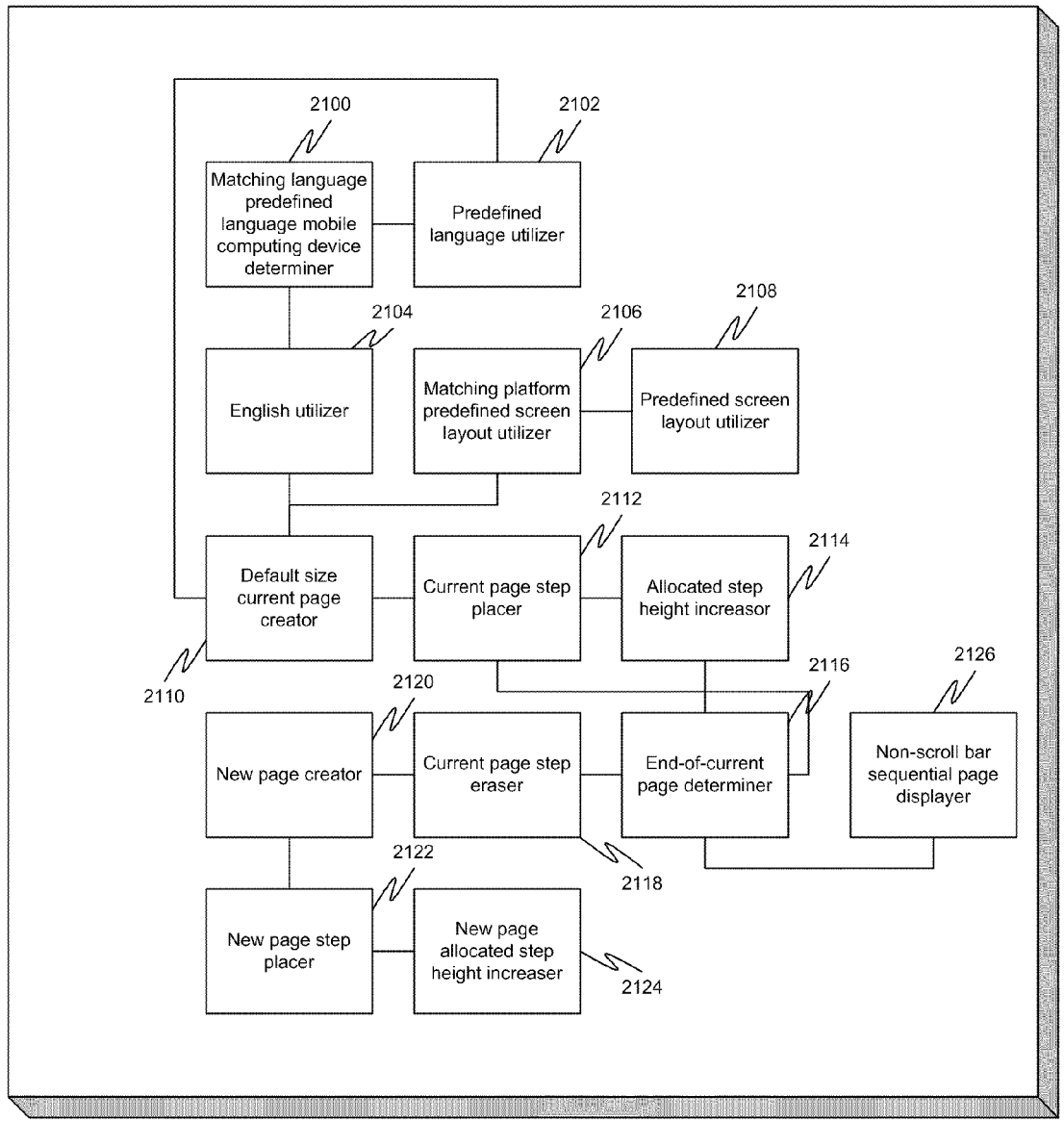
FIG. 21 is a block diagram illustrating an apparatus for providing a user interface for execution of one or more steps on a mobile computing device in accordance with an embodiment of the present invention.

FIG. 21 is a block diagram illustrating an apparatus for providing a user interface for execution of one or more steps on a mobile computing device in accordance with an embodiment of the present invention. Each element in this apparatus may be embodied in software, hardware, or any combination thereof. In this embodiment, the PocketPC operating system or a similar operating system may be utilized. A matching language predefined language mobile computing device determiner 2100 may determine if there is a predefined language for the one or more steps for a language matching the mobile computing device. If so, then a predefined language utilizer 2102 coupled to the matching language predefined language mobile computing device determiner 2100 may utilize the predefined language for the one or more steps. If not, then an English utilizer 2104 coupled to the matching language predefined language mobile computing device determiner 2100 may utilize English for the one or more steps. A matching platform predefined screen layout mobile computing device determiner 2106 may determine if there is a predefined screen layout for the one or more steps for a platform matching the mobile computing device. If so, then a predefined screen layout utilizer 2108 coupled to the matching platform predefined screen layout mobile computing device determiner 2106 may utilize the predefined screen layout for the one or more steps. If not, then a default size current page creator 2110 coupled to the predefined screen layout utilizer 2108, the English utilizer 2104, and to the predefined language utilizer 2102 may create a current page based on a default size. Then the process may proceed into a loop for each of the one or more steps. In this loop, a current page step placer 2112 coupled to the default size current page creator 2110 may place the step on the current page below any previous steps. An allocated step height increaser 2114 coupled to the current page step placer 2112 may increase a height allocated for the step on the current page if the step has multiple lines. An end-of-current page determiner 2116 coupled to the current page step placer 2112 and to the allocated step height increaser 2314 may determine if the placing and/or increasing causes the step to run past an end of the current page. If so, then a current page step eraser 2118 coupled to the end-of-current page determiner 2116 may erase the step from the current page. Then, a new page creator 2120 coupled to the end-of-current page determiner 2116 may create a new page. A new page step placer 2122 coupled to the new page creator 2120 may place the step on the new page and a new page allocated step height increaser 2124 coupled to the new page step placer 2122 may increase a height allocated for the step on the new page if the step has multiple lines. The new page may then be called the current page, at which point the process may loop back to the function performed by the current page step placer 2112 for the next step. Finally, a non-scroll bar sequential page displayer 2126 coupled to the end-of-current page determiner 2116 may sequentially display each page created without scroll bars.

Figure 22:
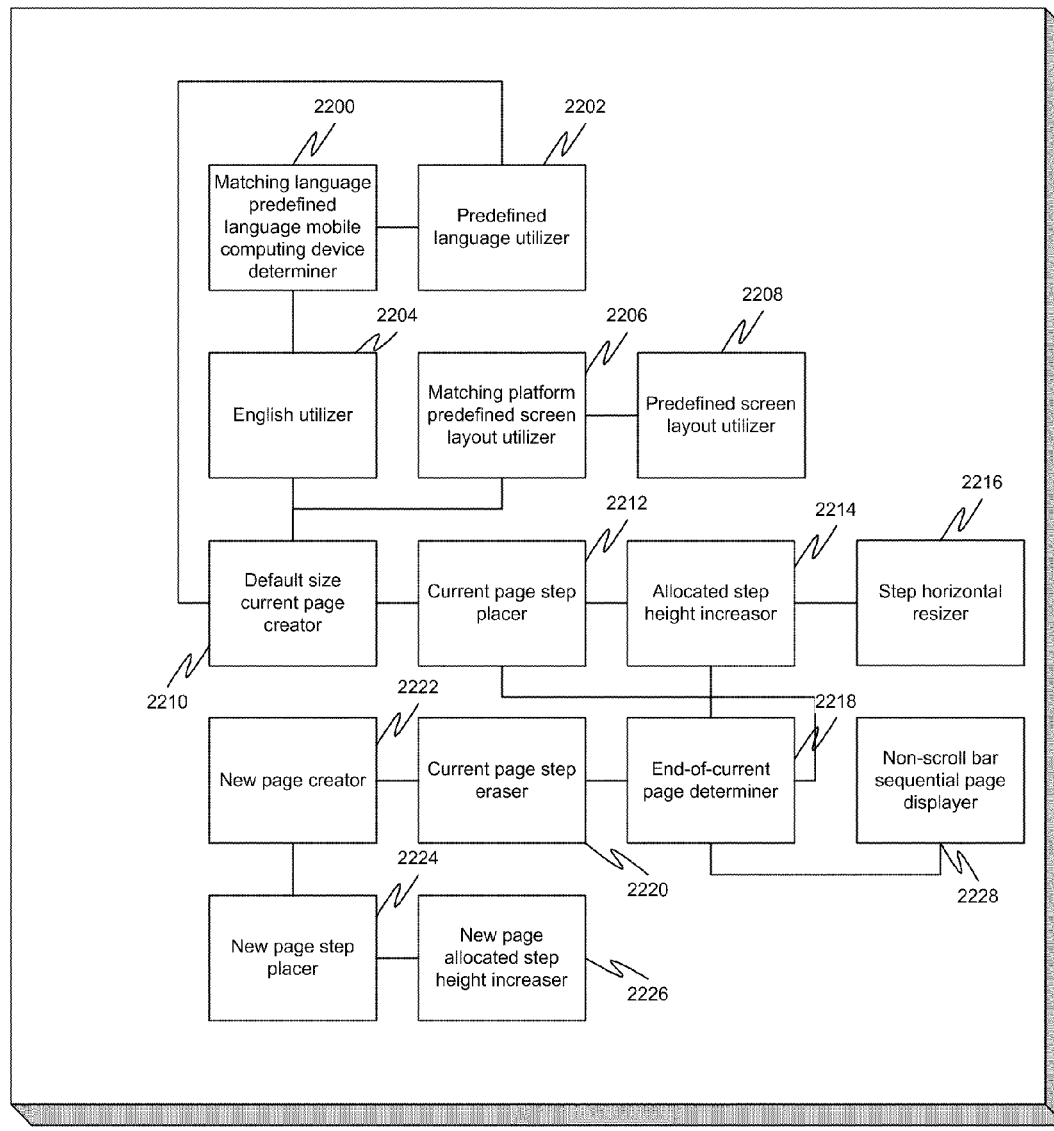
FIG. 22 is a block diagram illustrating an apparatus for providing a user interface for execution of one or more steps on a mobile computing device in accordance with an embodiment of the present invention.

FIG. 22 is a block diagram illustrating an apparatus for providing a user interface for execution of one or more steps on a mobile computing device in accordance with an embodiment of the present invention. Each element in this apparatus may be embodied in software, hardware, or any combination thereof. In this embodiment, the PocketPC operating system or a similar operating system may be utilized. A matching language predefined language mobile computing device determiner 2200 may determine if there is a predefined language for the one or more steps for a language matching the mobile computing device. If so, then a predefined language utilizer 2202 coupled to the matching language predefined language mobile computing device determiner 2200 may utilize the predefined language for the one or more steps. If not, then an English utilizer 2204 coupled to the matching language predefined language mobile computing device determiner 2200 may utilize English for the one or more steps. A matching platform predefined screen layout mobile computing device determiner 2206 may determine if there is a predefined screen layout for the one or more steps for a platform matching the mobile computing device. If so, then a predefined screen layout utilizer 2208 coupled to the matching platform predefined screen layout mobile computing device determiner 2206 may utilize the predefined screen layout for the one or more steps. If not, then a default size current page creator 2210 coupled to the predefined screen layout utilizer 2208, the English utilizer 2204, and to the predefined language utilizer 2202 may create a current page based on a default size. Then the process may proceed into a loop for each of the one or more steps. In this loop, a current page step placer 2212 coupled to the default size current page creator 2210 may place the step on the current page below any previous steps. An allocated step height increaser 2214 coupled to the current page step placer 2212 may increase a height allocated for the step on the current page if the step has multiple lines. A step horizontal resizer 2216 coupled to the allocated step height increaser 2214 may set the step to horizontally resize with the screen. An end-of-current page determiner 2218 coupled to the current page step placer 2212 and to the allocated step height increaser 2214 may determine if the placing and/or increasing causes the step to run past an end of the current page. If so, then a current page step eraser 2220 coupled to the end-of-current page determiner 2218 may erase the step from the current page. Then, a new page creator 2222 coupled to the end-of-current page determiner 2218 may create a new page. A new page step placer 2224 coupled to the new page creator 2222 may place the step on the new page and a new page allocated step height increaser 2226 coupled to the new page step placer 2224 may increase a height allocated for the step on the new page if the step has multiple lines. A new page step horizontal resizer 2228 coupled to the new page allocated step height increaser 2226 may set the step to horizontally resize with the screen. The new page may then be called the current page, at which point the process may loop back to the function performed by the current page step placer 2212 for the next step. Finally, a non-scroll bar sequential page displayer 2230 coupled to the new page creator 2222 may sequentially display each page created without scroll bars.

In an embodiment of the present invention, a smart database design is utilized in addition to the previously mentioned aspects to allow for efficient utilization of database space and processing time. In this design, only primary keys are used as meta-data to construct many-to-many relationships between table, resulting in amore robust, efficient database structure. Once tables of user-specific data are bound to the database as meta-data using their primary keys, the system may automatically ensure the handling of the records as related units. This eliminates the traditional heavy-weight dependence on foreign key relationships.

In an embodiment of the present invention, an object oriented design presents data in the database as objects and attributes. Data may be stored in a relational database, but may be accessed via a database access engine. All objects, attributes, and object definitions may then be stored in the database. This meta data may be read and used by the database access engine to present the system to the user and programmer.

In an embodiment of the present invention, the meta data for an object may describe its name, display names, icon, system type, and security attributes. The meta data for an object attribute (field) may describe its data type and length, input mechanism, display name, list valid values, system type, and other data. The database access engine may also support a "system type" for the object and/or attribute which allows the user to define a private, public, or protected object or field. A private object attribute is never visible or editable. A public object/attribute is visible and editable. A protected object/attribute is visible but not editable.

All user defined objects in the system may contain preset system fields that allow them to be recognized by the database access engine as a proprietary object and allow it to be involved in the various object support functions supported by the database access engine (relationships for example). The preset system fields may include an identification (the primary key), creation date, last update, created by, last updated by, name, and deleted by. The database access engine may maintain these system fields automatically. A record in the relational database management system may represent an instance of an object—also called an item. Furthermore, in an embodiment of the present invention, no record is ever physically deleted, but rather they are just marked as deleted. Archive functions may be provided to physically remove the item.

In an embodiment of the present invention, many-to-many relationships allow for any type of relationship to be modeled with no understanding of database concepts or redundancy of data. This relationship is made possible by a central relationship table. In an embodiment of the present invention, the relationship table may contain the parent object, the parent instance identification, the child object, and the child instance identification. Additionally, there are no database enforced key constraints on this table, allowing new tables or permutations to be added without restriction. All operations to make, remove, and search on the relationships in the relationship table maybe performed using the database access engine, which exposes this functionality as a set of objects with properties and methods. The system then may automatically prevent duplicate relationships or circular relationships from being defined.

In an embodiment of the present invention, a point and click interface may be utilized to design the objects. Additionally, the object definition may be serialized/deserialized for distribution to other installations of the smart database or for saving to disk for archiving purposes. The database model may provide for multiple types of objects to be created. Since all objects are exposed via the database access engine, the underlying logic to an object does not have to be a one-to-one correspondence to the relational table that a typical system would use to contain the data. Because the database access engine potentially exposes all functionality in object-oriented terms, SQL is not necessary or expected. Furthermore, the database access engine may handle all database management system-specific syntax.

In an embodiment of the present invention, the database access engine caches intelligently on an as-requested basis. Meta data is cached, for example, to prevent undue stress on the database platform. Caching of this type of information is done to give automatic performance boosts without having to understand indexes.

Figure 23:
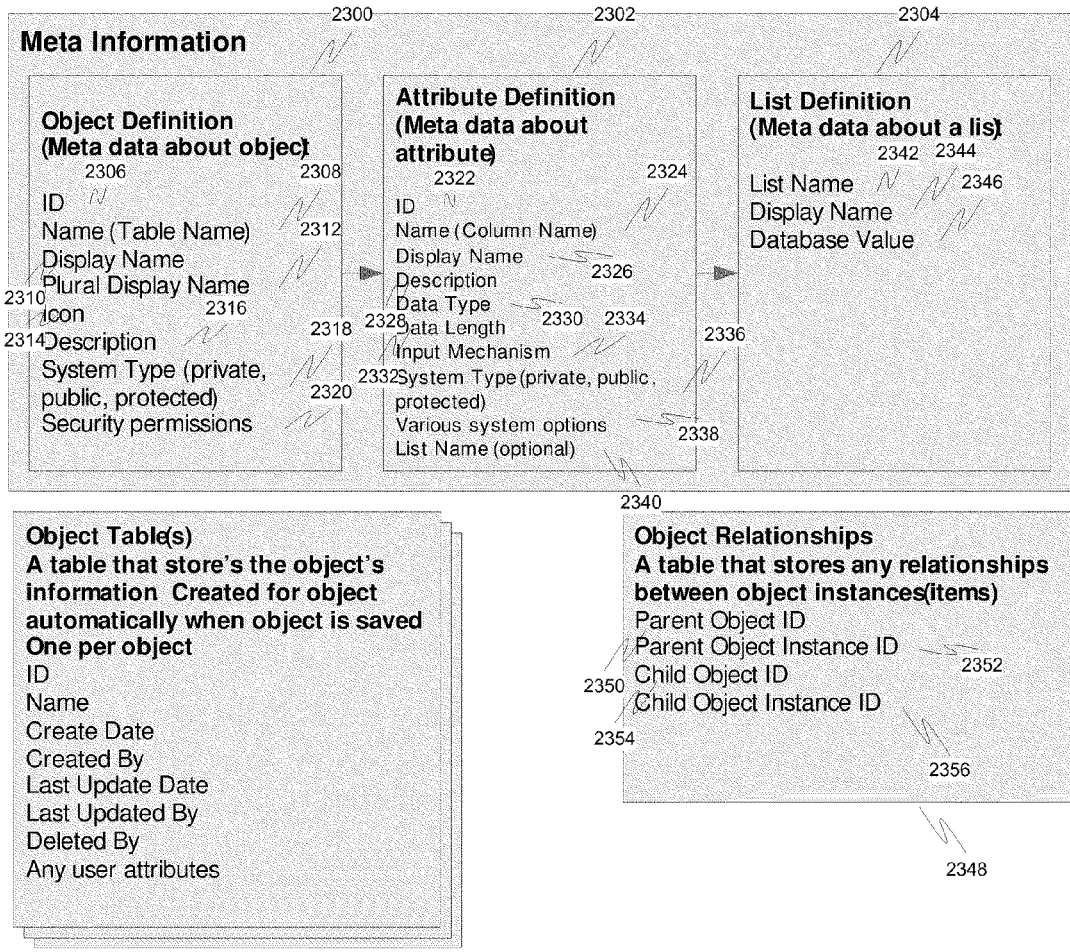
FIG. 23 is a diagram illustrating meta data in accordance with an embodiment of the present invention.

FIG. 23 is a diagram illustrating meta data in accordance with an embodiment of the present invention. As described above, meta data may be stored using one or more object definitions 2300 along with linked attribute definitions 2302, and potentially list definitions 2304 as well. An object definition may describe meta data about an object, and may contain an identification 2306, a name (which is in actuality a table name) 2308, a display name 2310, a plural display name 2312, an icon 2314, a description 2316, a system type 2318, and security permissions 2320. The system type 2318 may be private, public, or protected. The distinctions between these terms is described in more detail above.

Each object definition 2300 has a link to one or more attribute definitions 2302. Each attribute definition 2302 may describe meta data about an attribute (or column) of the data, and may contain an identification 2322, a name (which is in actuality a column name) 2324, a display name 2326, a description 2328, a data type 2330, a data length 2332, an input mechanism 2334, a system type 2336, various system options 2338, and a list name 2340. If the attribute definition 2302 contains a list name 2340, then it is an indication that there is a list definition 2304 linked to the attribute definition 2302.

A list definition 2304 may describe meta data about a list, and may contain a list name 2342, a display name 2344, and a database value 2346.

When a relationship between two or more objects is created, information regarding the relationship may be placed in a relationship table. Relationships between objects are commonly referred to as parent-child relationships. The relationship table 2348 may store, for each relationship, the parent object identification 2350, the parent object instance identification 2352, the child object identification 2354, and the child object instance identification 2356.

Figure 24:
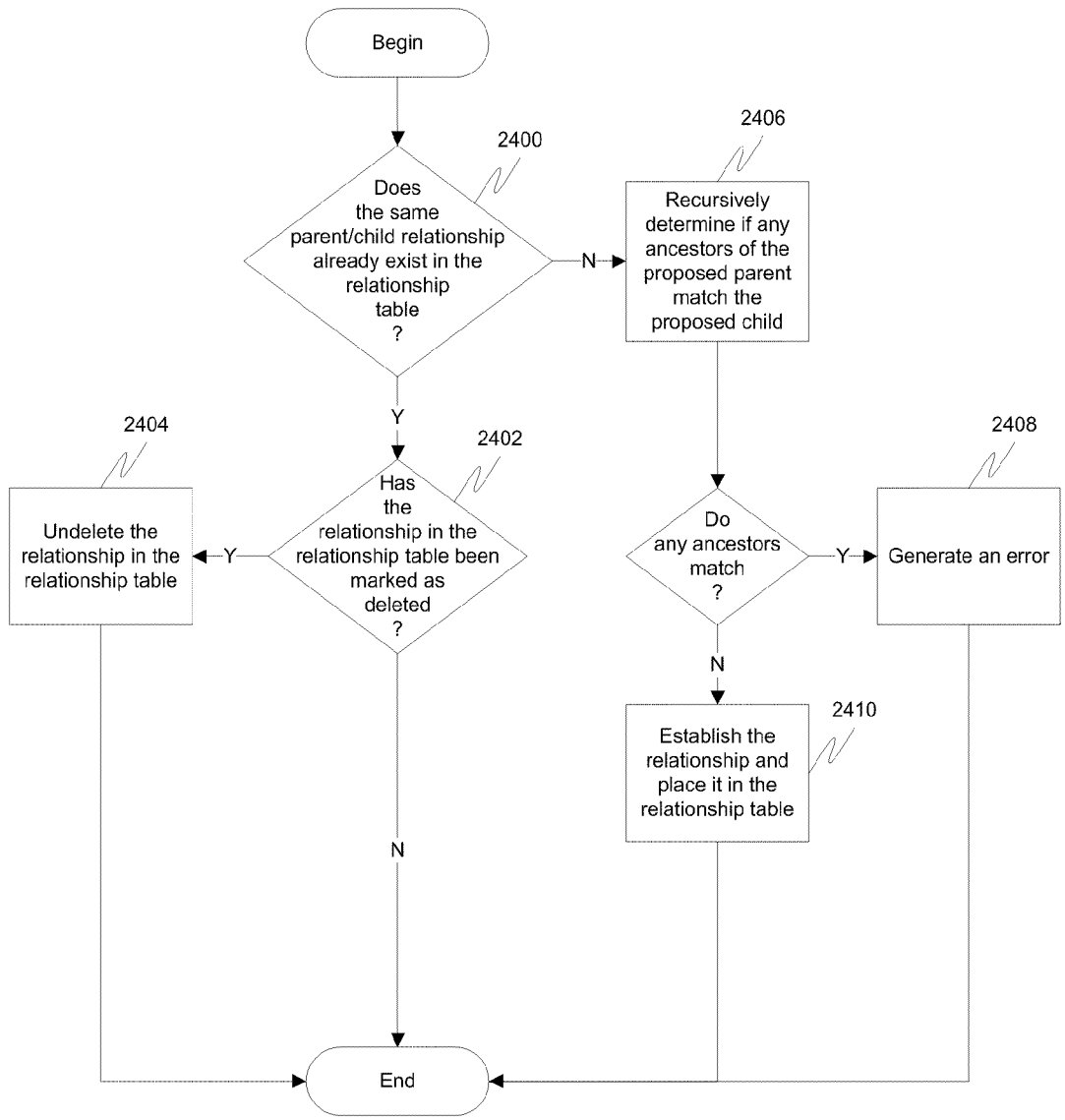
FIG. 24 is a flow diagram illustrating a method for handling a new relationship in accordance with an embodiment of the present invention.

As discussed briefly above, duplicate relationships and circular references may be avoided using an embodiment of the present invention. FIG. 24 is a flow diagram illustrating a method for handling a new relationship in accordance with an embodiment of the present invention. Each act of this method may be performed by software, hardware, or any combination thereof. At 2400, the system may examine the relationship table to ensure that the same parent/child relationship doesn't exist. If the relationship does exist, the request has already been fulfilled. In one embodiment of the present invention, relationships that are deleted aren't actually removed from the relationship table, but are merely marked as "deleted". If it is the case that the relationship to be added matches one that is in the relationship table but marked as deleted, the system may simply undelete the old relationship, thus reestablishing it. Thus, at 2402, it may be determined if the relationship in the relationship table has been marked as deleted. If so, then at 2404, it may be undeleted.

If the relationship does not exist in the relationship table, then at 2406, the system may determine recursively if any ancestors of the proposed parent match the proposed child. Since this is a recursive function, the system may first check parents of the proposed parent. Then it may check parents of parents of the proposed parent, and so on. In an embodiment of the present invention, the function may have a built in limit on the number of levels to recursively check (e.g., 10 levels), which will function as an upper limit on the number of levels to check, assuming the check hasn't run out of ancestors or a match has been found. If somewhere in this recursive check the proposed child was found to match an ancestor, at 2408 an error may be generated. If the check passes, however, then at 2410, the relationship may be established and placed in the relationship table.

When a user request that a relationship be broken, the system may simply label that relationship as deleted in the relationship table. The objects themselves may not be affected.

Figure 25:
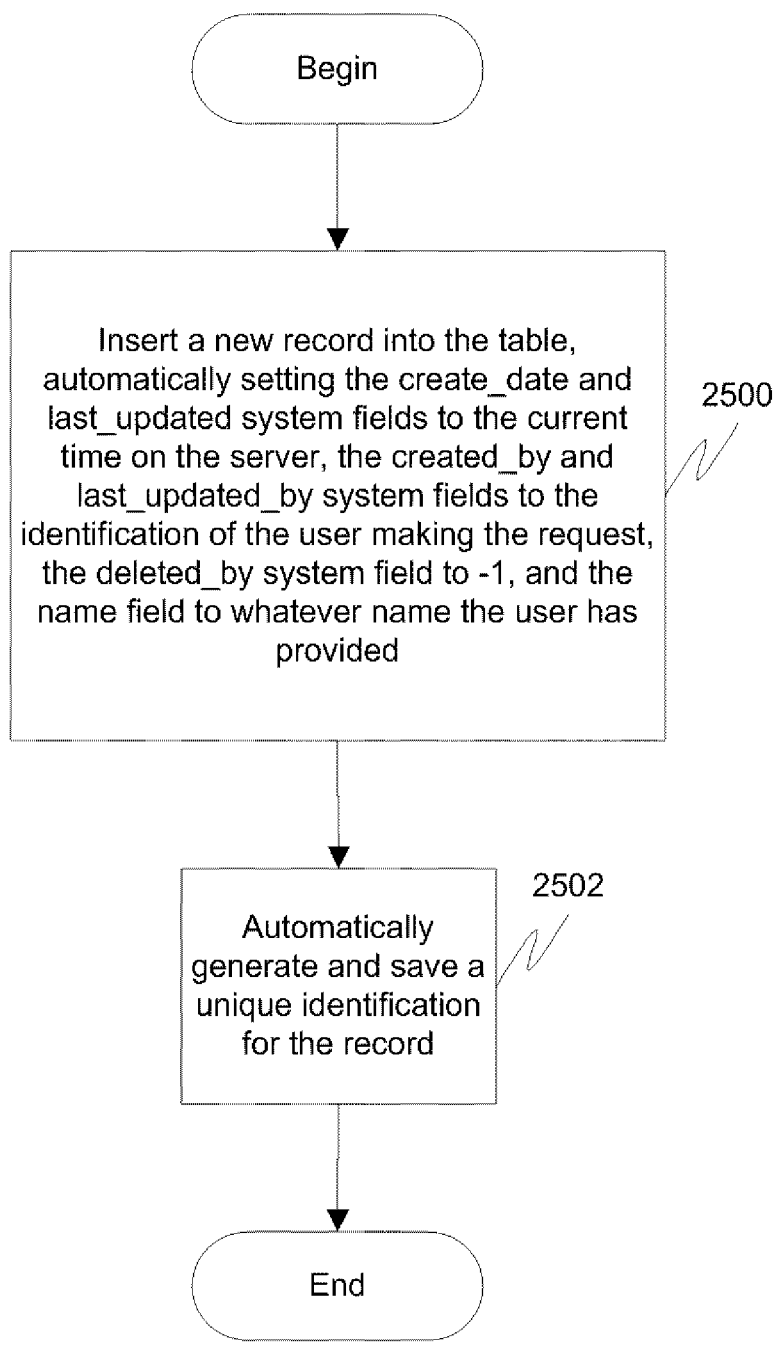
FIG. 25 is a flow diagram illustrating a method for inserting a new item of data into the database in accordance with an embodiment of the present invention.

FIG. 25 is a flow diagram illustrating a method for inserting a new item of data into the database in accordance with an embodiment of the present invention. Each act of this method may be performed by software, hardware, or any combination thereof. At 2500, the system may insert a new record into the table, automatically setting the create_date and last_updated system fields to the current time on the server, the created_by and last_updated_by system fields to the identification of the user making the request, the deleted_by system field to −1 (not deleted), and the name field to whatever name the user has provided. At 2502, a unique identification may be automatically generated for the record and saved in the record.

Figure 26:
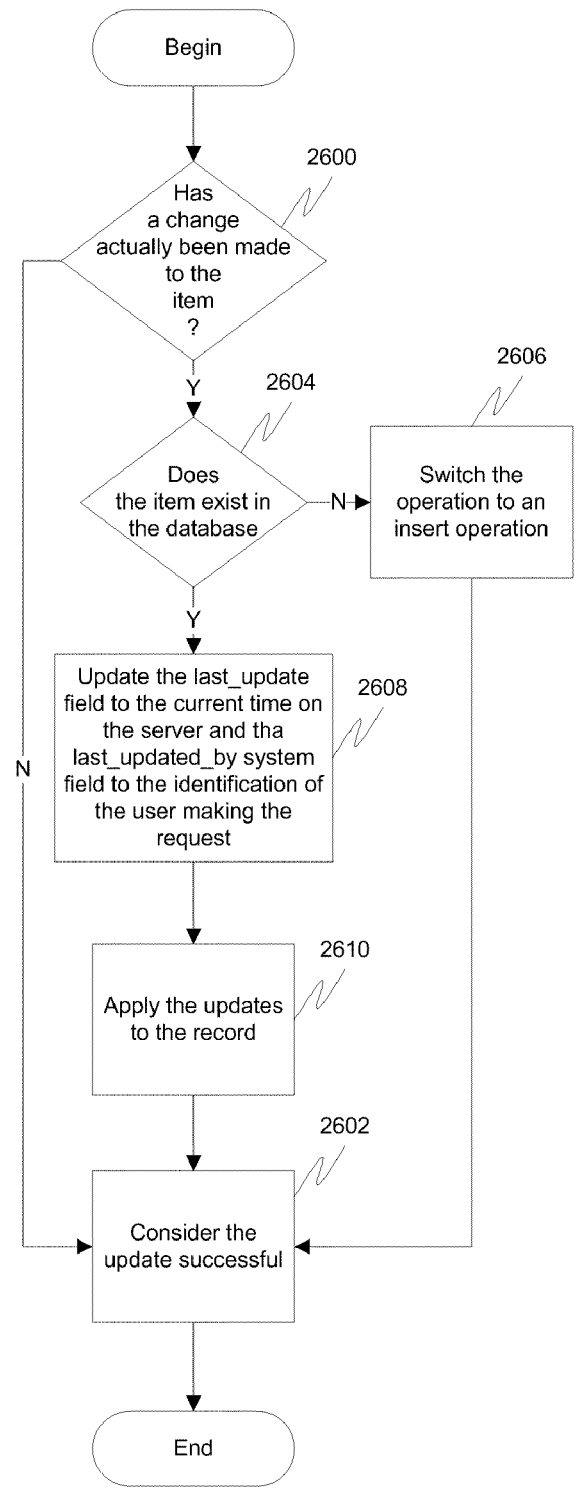
FIG. 26 is a flow diagram illustrating a method for updating an item in a database in accordance with an embodiment of the present invention.

FIG. 26 is a flow diagram illustrating a method for updating an item in a database in accordance with an embodiment of the present invention. Each act of this method may be performed by software, hardware, or any combination thereof. At 2600, the system may confirm that a change was actually made to the item. It may accomplish this by keeping the original values when the item is first loaded and comparing them to the current values. If no change was actually made, then at 2602 the update may be considered successful, even though no database operation is performed.

If a change was made, then at 2604 the system may confirm that the item exists in the database. This may be accomplished by comparing the unique identification of the item with the identifications of the item in the database. If it does not exist, then at 2606, the operation may be switched to an insert operation. This insert operation may differ from the insert operation described in FIG. 25 and the corresponding text by virtue of the fact that it does not need to generate a unique identification, as it already has one. The unique identification need only be saved. By switching to an insert operation, this ensures that records from separate databases can be easily replicated without having to worry about whether the item exists or not.

If a change has occurred and the item does exist in the database, then at 2608, the system may update the last_update field to the current time on the server and the last_updated_by system field to the identification of the user making the request. Then at 2610, the updates may be applied to the record.

Figure 27:
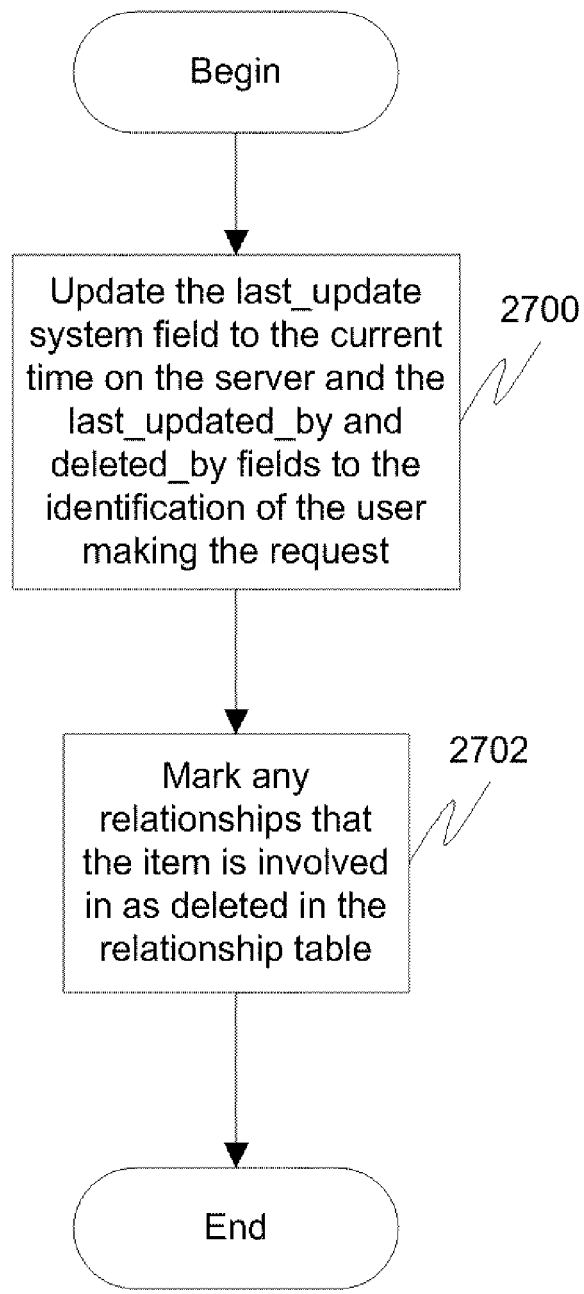
FIG. 27 is a flow diagram illustrating a method for deleting an item from a server in accordance with an embodiment of the present invention.

FIG. 27 is a flow diagram illustrating a method for deleting an item from a server in accordance with an embodiment of the present invention. Each act of this method may be performed by software, hardware, or any combination thereof.

At 2700, the system may update the last_update system field to the current time on the server, and the last_updated_by and deleted_by fields to the identification of the user making the request. Then, at 2702, any relationships that the item is involved in may also be marked as deleted in the relationship table.

It should be noted that in an embodiment of the present invention, "deletion" means that the system field of for deleted_by is marked with a valid user identification. If the deleted_by field is less than zero, the item may be considered not deleted. Additionally, in an embodiment of the present invention, if the user requests that an item be deleted from a client database, then the item may simply be physically deleted from the database. This is due to the fact that client databases are typically transitory and are limited in available disk space.

Figure 28:
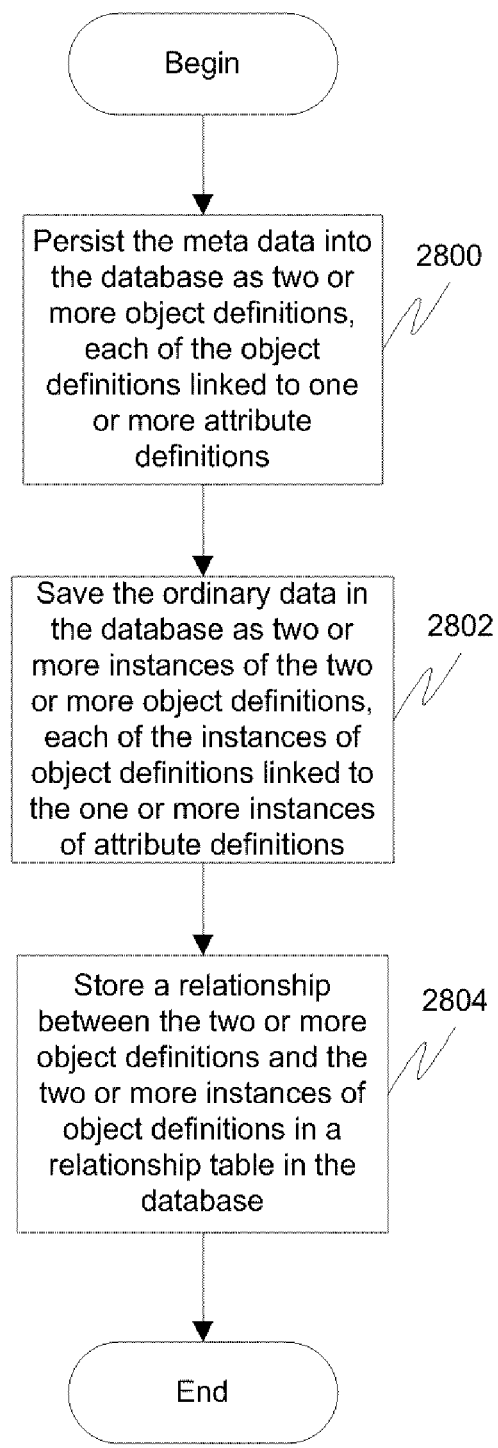
FIG. 28 is a flow diagram illustrating a method for storing data in a database in accordance with an embodiment of the present invention.

FIG. 28 is a flow diagram illustrating a method for storing data in a database in accordance with an embodiment of the present invention. Each act of this method may be performed by software, hardware, or any combination thereof. The data may contain ordinary data and meta data. At 2800, the meta data may be persisted into the database as two or more object definitions, each of the objected definitions linked to one or more attribute definitions. The attribute definitions may optionally be linked to list definitions. Each object definition may include an identification, a name (which is in actuality a table name), a display name, a plural display name, an icon, a description, a system type, and security permissions. The system type may be private, public, or protected. Each attribute definition may include an identification, a name (which is in actuality a column name), a display name, a description, a data type, a data length, an input mechanism, a system type, various system options, and a list name. If the attribute definition contains a list name, then it is an indication that there is a list definition linked to the attribute definition. At 2802, the ordinary data may be saved in the database as two or more instances of the two or more object definitions, each of the instances of object definitions linked to the one or more instances of attribute definitions. The instances of attribute definitions may optionally be linked to instances of list definitions. At 2804, a relationship between the two or more object definitions and the two or more instances of object definitions may be stored in a relationship table in the database. This may be accomplished by storing an identification of a parent object definition and an identification of a parent instance of the parent object definition in a relationship table along with an identification of a child object definition and an identification of a child instance of the child object definition.

Figure 29:
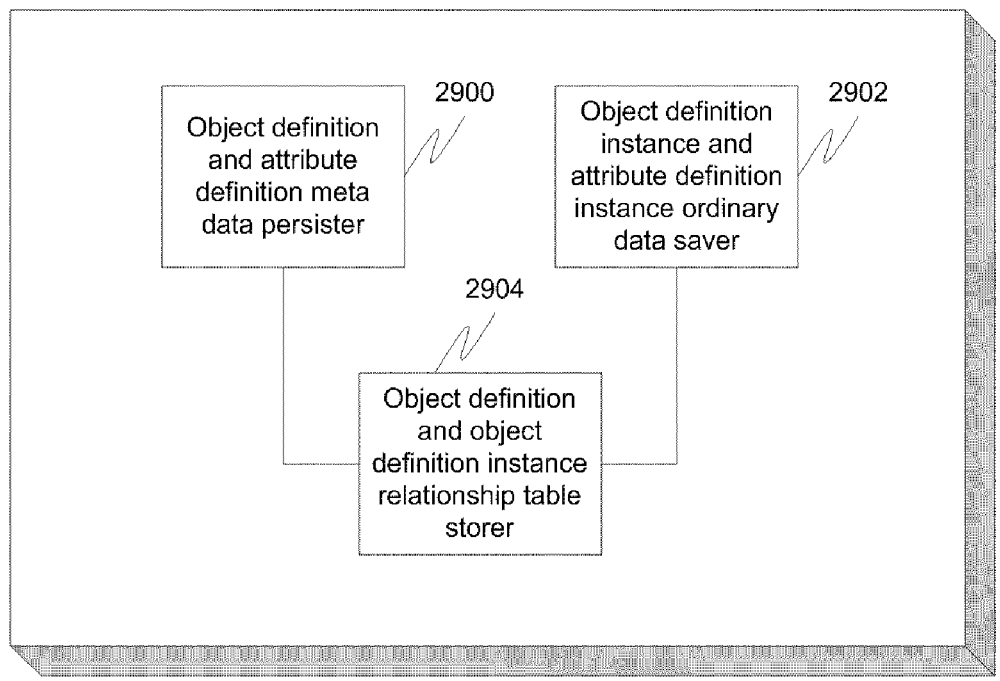
FIG. 29 is a block diagram illustrating an apparatus for storing data in a database in accordance with an embodiment of the present invention.

FIG. 29 is a block diagram illustrating an apparatus for storing data in a database in accordance with an embodiment of the present invention. Each element of this apparatus may be embodied in software, hardware, or any combination thereof. The data may contain ordinary data and meta data. An object definition and attribute definition meta data persister 2900 may persist the meta data into the database as two or more object definitions, each of the objected definitions linked to one or more attribute definitions. The attribute definitions may optionally be linked to list definitions. Each object definition may include an identification, a name (which is in actuality a table name), a display name, a plural display name, an icon, a description, a system type, and security permissions. The system type may be private, public, or protected. Each attribute definition may include an identification, a name (which is in actuality a column name), a display name, a description, a data type, a data length, an input mechanism, a system type, various system options, and a list name. If the attribute definition contains a list name, then it is an indication that there is a list definition linked to the attribute definition. An object definition instance and attribute definition instance ordinary data saver 2902 may save the ordinary data in the database as two or more instances of the two or more object definitions, each of the instances of object definitions linked to the one or more instances of attribute definitions. The instances of attribute definitions may optionally be linked to instances of list definitions. An object definition and object definition instance relationship table storer 2904 coupled to the object definition and attribute definition meta data persister 2900 and to the object definition instance and attribute definition instance ordinary data saver 2902 may store a relationship between the two or more object definitions and the two or more instances of object definitions in a relationship table in the database. This may be accomplished by storing an identification of a parent object definition and an identification of a parent instance of the parent object definition in a relationship table along with an identification of a child object definition and an identification of a child instance of the child object definition.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for deploying projects to one or more client computing devices from a server, each of said projects including one or more tasks, each of the tasks having one or more steps, the method comprising:
   creating a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming;
   deploying said project to one or more client computing devices, said one or more client computing devices selected based on said project information;
   providing, to the one or more client computing devices, access to a central database such that the server provides data from the central database to the one or more client computing devices while the one or more computing devices are executing one or more tasks of said project;
   receiving results from execution of one or more tasks of said project from said one or more client computing devices; and
   displaying a portion of said results to a business administrator.

2. The method of claim 1, wherein said projects include one or more workflows to be fired upon validation of a step or after a value has been accepted into a step.

3. A method for deploying projects to one or more client computing devices from a server, each of said projects including one or more tasks, the method comprising:
   creating a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming;

determining project information about the project;

deploying said project to one or more client computing devices for execution, said one or more client computing devices selected based on said project information;

receiving a modification to said project information from a business administrator;

automatically updating said one or more client computing devices having been deployed said project with said modification, said modification to be implemented at said one or more client computing devices while one or more tasks of said project are executing;

receiving results from execution of said one or more tasks of said project from said one or more client computing devices; and displaying a portion of said results to said business administrator.

4. A method for deploying projects to one or more client computing devices from a server, each of said projects including one or more tasks, the method comprising:

creating a project by:
presenting said business administrator with a screen allowing said business administrator to add a step to a task of said project;

receiving a request to add a step from said business administrator, wherein the step is specified without using computer programming;

presenting said business administrator with a screen allowing said business administrator to add a prompt for said step, a data type expected for data, and an input mechanism for said data; and receiving a prompt for said step, a data type expected for data, and an input mechanism for said data from said business administrator, wherein the prompt for said step, a data type expected for data, and an input mechanism are specified without using computer programming;

receiving workflow from the user, wherein the workflow is specified without using computer programming and describes elements that will fire when one or more corresponding steps are validating input or after the corresponding steps have accepted a value determining project information about the project;

determining project information about the project;

deploying said project to one or more client computing devices, said one or more client computing devices selected based on said project information;

receiving results from execution of one or more tasks of said project from said one or more client computing devices; and displaying a portion of said results to said business administrator.

5. The method of claim 4, wherein said creating further includes:

presenting said business administrator with a screen allowing said business administrator to add workflow to said step; and receiving workflow to be added to said step from said business administrator.

6. The method of claim 4, wherein said creating further includes:

presenting said business administrator with a screen allowing said business administrator to set options for said step, said options selected from the set comprising: name, default value, range of numeric values or string lengths allowed, lists, and format; and receiving options for said step from said business administrator.

7. An apparatus for deploying projects to one or more client computing devices from a server, each of said projects including one or more tasks, the apparatus comprising:

a project creator designed to create a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming;

a project information determiner;

a project client computing device deployer coupled to said business administrator project information receiver;

a client computing device task execution results receiver; and a results portion business administrator displayer coupled to said client computing device task execution results receiver.

8. An apparatus for deploying projects to one or more client computing devices from a server, each of said projects including one or more tasks, the apparatus comprising:

a project creator designed to create a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming;

a project information determiner;

a project client computing device deployer coupled to said business administrator project information receiver;

a business administrator project information modification receiver;

a project modification client computing device automatic updater coupled to said business administrator project information modification receiver;

a client computing device task execution results receiver; and a results portion business administrator displayer coupled to said client computing device task execution results receiver.

9. An apparatus for deploying projects to one or more client computing devices from a server, each of said projects including one or more tasks, the apparatus comprising:

a project creator designed to create a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming wherein said project creator includes:
- a business administrator add step screen presenter;
- a business administrator add step request receiver coupled to said business administrator add step screen presenter;
- a business administrator add prompt, data type, and input mechanism screen presenter coupled to said business administrator add step request receiver;
- a business administrator prompt, data type, and input mechanism receiver coupled to said business administrator add prompt, data type, and input mechanism screen presenter;
- a project information determiner;
- a project client computing device deployer coupled to said business administrator project information receiver;
- a client computing device task execution results receiver; and
- a results portion business administrator displayer coupled to said client computing device task execution results receiver.

10. The apparatus of claim 9, wherein said project creator further includes:
- a business administrator add workflow screen presenter coupled to said business administrator prompt, data type, and input mechanism receiver; and
- a business administrator workflow receiver coupled to said business administrator add workflow screen presenter.

11. The apparatus of claim 9, wherein said project creator further includes:
- a business administrator step options screen presenter coupled to said business administrator prompt, data type, and input mechanism receiver; and
- a business administrator step options receiver coupled to said business administrator step options screen presenter.

12. An apparatus for deploying projects to one or more client computing devices from a server, each of said projects including one or more tasks, each of the tasks having one or more steps, the method comprising:
- means for creating a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming;
- means for determining project information about the project;
- means for deploying said project to one or more client computing devices, said one or more client computing devices selected based on said project information;
- means for providing, to the one or more client computing devices, access to a central database such that the server provides data from the central database to the one or more client computing devices while the one or more computing devices are executing one or more tasks of said project;
- means for receiving results from execution of one or more tasks of said project from said one or more client computing devices; and
- means for displaying a portion of said results to a business administrator.

13. A method for deploying projects to one or more client computing devices from a server, each of said projects including one or more tasks, the method comprising:
- means for creating a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming;
- means for determining project information about the project;
- means for deploying said project to one or more client computing devices for execution, said one or more client computing devices selected based on said project information;
- means for receiving a modification to said project information from a business administrator;
- means for automatically updating said one or more client computing devices having been deployed said project with said modification, said modification to be implemented at said one or more client computing devices while one or more tasks of said project are executing;
- means for receiving results from execution of said one or more tasks of said project from said one or more client computing devices; and
- means for displaying a portion of said results to said business administrator.

14. A method for deploying projects to one or more client computing devices from a server, each of said projects including one or more tasks, the method comprising:
- means for creating a project based on user input, wherein the project contains applications and workflow, wherein each application includes a series of data gathering steps, each data gathering step specified by an onscreen prompt for data, a type of data expected, and a type of input mechanism used to capture data, and wherein the workflow describes elements that will fire when one or more corresponding steps are validating input or after the corresponding steps have accepted a value determining project information about the project, wherein the user input does not include computer programming by:
  - presenting said business administrator with a screen allowing said business administrator to add a step to a task of said project;
  - receiving a request to add a step from said business administrator;
  - presenting said business administrator with a screen allowing said business administrator to add a prompt for said step, a data type expected for data, and an input mechanism for said data; and
  - receiving a prompt for said step, a data type expected for data, and an input mechanism for said data from said business administrator;
- means for determining project information about the project;

means for deploying said project to one or more client computing devices, said one or more client computing devices selected based on said project information;

means for receiving results from execution of one or more tasks of said project from said one or more client computing devices; and means for displaying a portion of said results to said business administrator.

* * * * *